United States Patent
Sato et al.

(10) Patent No.: US 6,230,189 B1
(45) Date of Patent: *May 8, 2001

(54) APPARATUS AND METHOD FOR AN HTTP SERVER CAPABLE OF CONNECTING FACSIMILE APPARATUSES AND DATA TERMINALS

(75) Inventors: Fumihiko Sato, Machida; Futoshi Oseto, Yokohama, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,946

(22) Filed: Dec. 9, 1998

(30) Foreign Application Priority Data

Dec. 9, 1997 (JP) .................................................. 9-354090
Jan. 21, 1998 (JP) ................................................ 10-022549

(51) Int. Cl.⁷ .................................................. G06F 15/16
(52) U.S. Cl. .......................... 709/206; 709/202; 709/205; 709/217; 709/218; 709/245; 358/401; 358/403; 358/407; 379/100.01
(58) Field of Search ..................................... 709/201–206, 709/213, 217–218, 238, 245; 707/10, 104; 358/400–407, 442, 468; 379/100.01–100.03, 100.09, 201

(56) References Cited

U.S. PATENT DOCUMENTS

| | | | | |
|---|---|---|---|---|
| 5,737,395 | * | 4/1998 | Irribarren | 709/206 |
| 5,793,972 | * | 8/1998 | Shane | 709/219 |
| 5,838,458 | * | 11/1998 | Tsai | 358/402 |
| 5,870,549 | * | 2/1999 | Bobo, II | 709/206 |
| 5,881,233 | * | 3/1999 | Toyoda et al. | 709/233 |
| 5,894,554 | * | 4/1999 | Lowery et al. | 709/203 |
| 5,907,598 | * | 5/1999 | Mandalia et al. | 379/100.01 |
| 5,940,834 | * | 8/1999 | Pinard et al. | 707/102 |
| 5,974,447 | * | 10/1999 | Cannon et al. | 709/206 |
| 6,028,679 | * | 2/2000 | Murphy | 358/407 |
| 6,028,917 | * | 2/2000 | Creamer et al. | 379/100.01 |
| 6,058,169 | * | 5/2000 | Bramnick et al. | 379/100.01 |

FOREIGN PATENT DOCUMENTS

| | | | | |
|---|---|---|---|---|
| 10-107944 | | 4/1998 | (JP) | H04N/1/00 |
| 10-304128 | * | 11/1998 | (JP) | H04N/1/00 |
| 11-055448 | * | 2/1999 | (JP) | H04N/1/00 |
| 11-150645 | * | 6/1999 | (JP) | H04N/1/32 |

* cited by examiner

Primary Examiner—Zarni Maung
Assistant Examiner—Bharat Barot
(74) Attorney, Agent, or Firm—Cooper & Dunham LLP

(57) ABSTRACT

A communications terminal includes a first memory, an address conversion table, a first web page generator, an electronic mail generator, and first and second communications controllers. The first memory stores a transfer-request image file based on image information, which is sent through a transfer-request call with a destination address from a facsimile terminal. The address conversion table converts the destination address into at least one transfer address which individually corresponds to at least one data terminal. The first web page generator opens a first web page including a link to the transfer-requested image file. The electronic mail generator informs the data terminal of the transfer-request image file by electronic mail including a first web page locator. The first communications controller receives a first delivery request which is sent by the data terminal, using the first web page locator and a predetermined web page browsing procedure, and transmits the first web page to the data terminal upon receiving the first delivery request. The second communications controller receives a second delivery request which is sent by the data terminal through the first web page and transmits the transfer-request image file to the data terminal upon receiving the second delivery request.

57 Claims, 18 Drawing Sheets

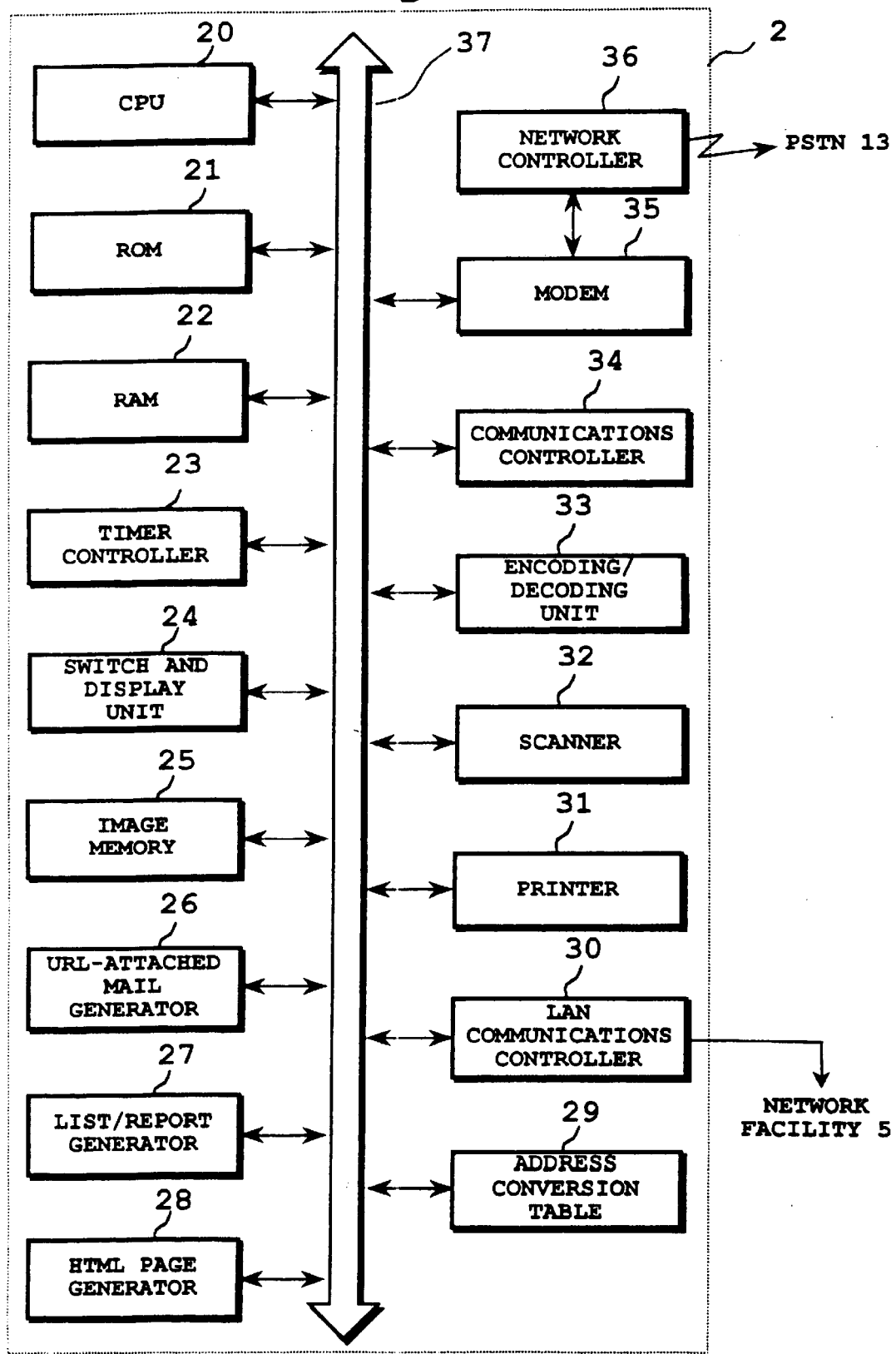

Fig. 4

ADDRESS CONVERSION TABLE ~29

| SUB-ADDRESS | E-MAIL ADDRESS |
|---|---|
| 001 | Mori@abcd.vwxyz.co.jp |
| 002 | Watanabe@abcd.vwxyz.co.jp |
| 003 | Tanaka@abcd.vwxyz.co.jp |
| ... | ... |

Fig. 7

FAX-TO-LAN RECEIVED FILE LIST
(05/22/1997)

COMMUNICATIONS HISTORY PAGE

| FILE NO. | RECEIVED DATE & TIME | DESTINATION |
|---|---|---|
| 0010 | 97/05/22 09:05 | 1122223333 |
| 0011 | 97/05/22 10:30 | 0123456789 |

COMMUNICATIONS HISTORY INDICES 42

| FILE NUMBER | DATE | START TIME | DESTINATION | MODE | TIME | PAGE | RESULT |
|---|---|---|---|---|---|---|---|
| ... | ... | ... | ... | ... | ... | ... | ... |
| 0010 | 97/05/22 | 09:05 | 1122223333 | G3 | 30 s | 2 | OK |
| 0011 | 97/05/22 | 10:30 | 0123456789 | G3ECM | -- | -- | NG |
| 0012 | 97/05/22 | 10:35 | 0123456789 | G3ECM | 60 s | 5 | OK |
| ... | ... | ... | ... | ... | ... | ... | ... |

Fig. 9

COMMUNICATIONS HISTORY TABLE
(05/22/1997) — 43

| FILE NO. | DATE | START TIME | DESTINATION | MODE | TIME | PAGE | RESULT |
|---|---|---|---|---|---|---|---|
| | | | | | | | MASTER WEB PAGE |
| 0010 | 97/05/22 | 09:05 | 1122223333 | G3 | 30 s | 2 | OK |
| 0011 | 97/05/22 | 10:30 | 0123456789 | G3ECM | 60 s | 5 | OK |

Fig. 15

| FILE NO. | TIFF | GIF | JPEG | X-X BITMAP |
|---|---|---|---|---|
| 001 | 39 KB | 44 KB | 50 KB | 1875 KB |
| 002 | 53 KB | 12 KB | 54 KB | 1875 KB |
| . . . | . . . | . . . | . . . | . . . |

| FILE NO. | PREVIOUSLY ACCEPTED DATA FORMAT | PREVIOUSLY SELECTED DATA FORMAT | TIFF | GIF | JPEG | ... |
|---|---|---|---|---|---|---|
| 001 | TIFF GIF JPEG | TIFF | 39 KB | 44 KB | 50 KB | ... |
| 002 | TIFF GIF JPEG | GIF | 53 KB | 12 KB | 54 KB | ... |
| ... | ... | ... | ... | ... | ... | ... |

46

APPARATUS AND METHOD FOR AN HTTP SERVER CAPABLE OF CONNECTING FACSIMILE APPARATUSES AND DATA TERMINALS

BACKGROUND

1. Field

The disclosed system and method relates to a network facsimile apparatus. More particularly, the disclosed system and method relates to a network facsimile apparatus which is capable of performing an HTTP server function while avoiding an increase of data storage.

2. Description of the Related Arts

There has been developed a so-called network facsimile machine that is capable of exchanging data (e.g. electronic mail) with other data terminals via a local area network (LAN) and the Internet, as well as exchanging facsimile data with other facsimile machines via a public switched telephone network (PSTN). Such a network facsimile machine is capable of transmitting image information to both users of data terminals (e.g. personal computers) on the local area network and of facsimile machines connected to the public switched telephone network. Also, the network facsimile machine may transmit image information to data terminals connected to other local area networks when the local area network of the network facsimile machine is connected to other local area networks through the Internet.

Moreover, users can transmit image information from a facsimile machine to data terminals on a local area network via the network facsimile machine. This function of the network facsimile machine may be referred to as an information relay function or an information transfer function. The network facsimile machine can also relay information to other network facsimile machines across local area networks.

In many cases, the facsimile terminal sends a sub-address to the network facsimile machine when requesting the information relay operation. The sub-address for this use is defined by the Group 3 facsimile protocol according to the recommendation T.30 of ITU-T (international telecommunication union-telecommunication). On the other hand, a typical communications method for communicating between the data terminals on a local area network is E-mail (electronic mail) and each of the data terminals is generally assigned an individual E-mail address. To connect the sub-address to the E-mail address, the network facsimile machine is provided with an address conversion table for converting a sub-address into an E-mail address so that a communications machine outside the local area network can specify a destination data terminal on a local area network.

When the relay transmission is requested by a data terminal in which a destination machine is a facsimile terminal, the data terminal writes a facsimile number in a header of E-mail. Thereby, the network facsimile machine can perform relay transmission by designating the destination facsimile terminal using the facsimile number provided.

Accordingly, users can greatly benefit from such convenient connections between networks of the facsimile machines and the data terminals by means of the network facsimile machine. However, the above-mentioned system has a drawback of increasing amount of data to store. This is because the network facsimile machine, or a mail server system, in a local area network is required to store a great amount of facsimile image information, of which data volume is extremely large compared to that of a typical E-mail. In particular, when the above-described sub-address corresponds to a plurality of E-mail addresses, the network facsimile machine, or the mail server system, is required to store the facsimile image information for each E-mail address, resulting in a considerable increase in the amount of data stored.

SUMMARY

The present application provides a communications terminal that can be coupled to a local area network and a public telephone network and that performs an HTTP (hyper text transfer protocol) server function. In one embodiment, the communications terminal includes a first memory, an address conversion table, a first web page generator, an electronic mail generator, a first communications controller, and a second communications controller.

The first memory stores a transfer-request image file based on image information, which is sent through a transfer-request call from a facsimile terminal via the public switched telephone network through a first predetermined communications procedure. At this time, the transfer-request call includes a destination address. The address conversion table converts the destination address into at least one transfer address which individually corresponds to at least one data terminal coupled to the local area network.

The first web page generator generates a first web page which includes a link to the transfer-requested image file stored in the first memory and that opens the first web page to the local area network. The electronic mail generator informs the above-mentioned at least one data terminal of the transfer-request image file by electronic mail using the above-mentioned at least one transfer address and through a second communications procedure. The electronic mail includes a first web page locator.

The first communications controller receives a first delivery request which is sent by the above-mentioned at least one data terminal, using the first web page locator and a predetermined web page browsing procedure, and transmits the first web page to the above-mentioned at least one data terminal upon receiving the first delivery request. The second communications controller receives a second delivery request which is sent by the above-mentioned at least one data terminal through the first web page and transmits the transfer-request image file to the at least one data terminal upon receiving the second delivery request.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a block diagram of the network facsimile apparatus included in the electronic communications system of FIG. 1;

FIG. 4 is an exemplary address conversion table used in the network facsimile apparatus of FIG. 2;

FIG. 7 is an exemplary form of a master web page generated by the network facsimile apparatus of FIG. 2;

FIG. 8 is an exemplary form of a communications history table controlled by the network facsimile apparatus of FIG. 2;

FIG. 9 is an exemplary form of a communications history web page generated by the network facsimile apparatus of FIG. 2;

FIG. 15 is a table for explaining a plurality of different data formats provided to the network facsimile apparatus of FIG. 2.

FIG. 18 is another table for explaining a plurality of different data formats provided to the network facsimile apparatus of FIG. 2.

DETAILED DESCRIPTION

Figure 1:
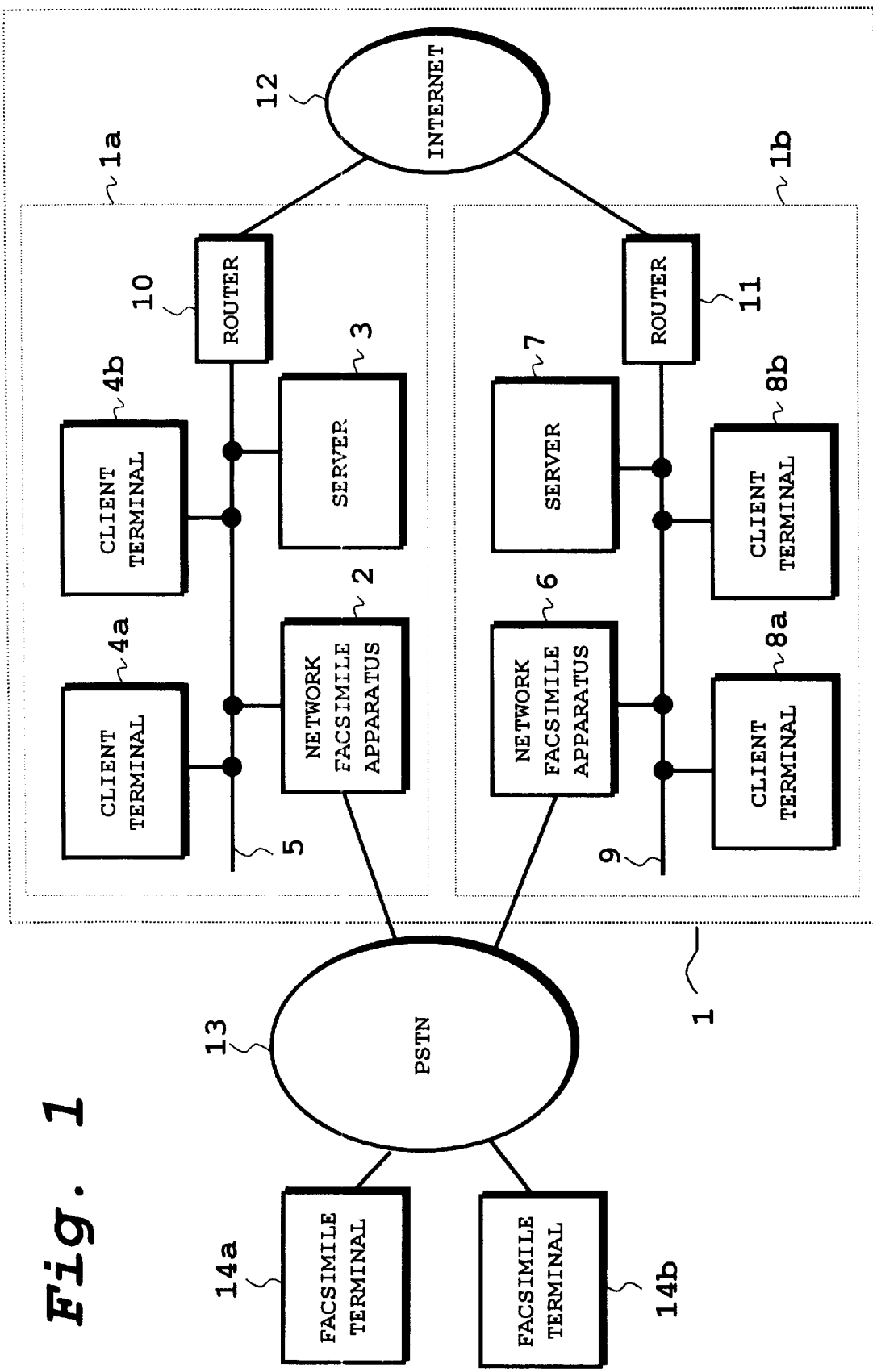
FIG. 1 is a block diagram of an electronic communications system including a network facsimile apparatus according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a communications network 1. The communications network 1 of FIG. 1 includes two exemplary local area networks (LANs) 1a and 1b which are operatively connected with each other through the Internet 12. The local area network (LAN) 1a includes a network facsimile apparatus 2, a server 3, client terminals 4a and 4b such as personal computers, a network facility 5, and a router 10. The network facility 5 provides bidirectional connections between the network facsimile apparatus 2, the server 3, the client terminals 4a and 4b, and the router 10. The local area network (LAN) 1b includes a network facsimile apparatus 6, a server 7, client terminals 8a and 8b such as personal computers, a network facility 9, and a router 11. The network facility 9 provides bi-directional connections between the network facsimile apparatus 6, the server 7, the client terminals 8a and 8b, and the router 11.

The electronic communications system of FIG. 1 further includes a public switched telephone network (PSTN) 13 and exemplary facsimile terminals 14a and 14b. The PSTN 13 may alternatively be an integrated services digital network (ISDN), or the like. The facsimile terminals 14a and 14b and the network facsimile apparatus 2 and 6 of the communications network 1 are connected to the PSTN 13. Preferably, but not limited to, each of the facsimile terminals 14a and 14b and the network facsimile apparatus 2 and 6 transmits and receives image information through a Group 3 facsimile communications procedure.

Each of client terminals 4a and 4b of the LAN 1a and the client terminals 8a and 8b of the LAN 1b has a communication feature compatible to the Ethernet for physical and data link layers and a TCP/IP (transmission control protocol/Internet protocol) for network and transport layers. These client terminals 4a, 4b, 8a, and 8b can accordingly exchange data via the network facilities 5 and 9, the routers 10 and 11, and the Internet 12, through operations by various kinds of application programs. These application programs may be used for exchanging text-based electronic mail (hereinafter referred to as E-mail) under an SMTP (simple mail transfer protocol), or non-text data such as image or voice data under a MIME (multipurpose Internet message extensions), or file data under a FTP (file transfer protocol).

In each of the LANs 1a and 1b, a POP (post office protocol) is applied; the server 3, for example, operates as a POP server, and the client terminals 4a and 4b and the network facsimile apparatus 2, for example, operate as POP clients. Under the POP protocol, the POP server 3, for example, receives E-mails sent from inside or outside of the local area network and holds any E-mails addressed to the POP clients such as the client terminals 4a and 4b and the network facsimile apparatus 2. Then, at a predetermined timing, the POP server 3 delivers the E-mail to the addressed client terminal among the client terminals 4a and 4b and the network facsimile apparatus 2.

Each of the client terminals 4a, 4b, 8a, and 8b is provided with an Internet home page browser (application software) communicable to an HTTP (hyper text transfer protocol) protocol so as to be operable as an HTTP client. Accordingly, each of the client terminals 4a, 4b, 8a, and 8b is capable of accessing HTTP servers (not shown) on the communications network 1 in order to browse and obtain page information (web page) stored therein, by the communications on the TCP (transmission control protocol) in accordance with the protocol of HTTP. In the embodiment being explained, the network facsimile apparatuses 2 and 6 have a function of the HTTP server, which will be explained later.

Since the network facsimile apparatuses 2 and 6 have the same hardware and software configurations, both apparatuses are capable of performing the same functions in the same manner. Accordingly, it is understood throughout the present specification that, when the description below refers to one of the apparatuses for the sake of simplicity, such description applies to both apparatuses. This applies not only to the network facsimile apparatuses 2 and 6 but also to the LANs 1a and 1b, the server 3 and 7, the client terminals 4a, 4b, 8a, and 8b, the router 10 and 11, and the facsimile terminals 14a and 14b.

Next, an exemplary structure of the network facsimile apparatus 2 is explained with reference to FIG. 2. The network facsimile apparatus 2 includes a CPU (central processing unit) 20, a ROM (read only memory) 21, a RAM (random access memory) 22, a timer controller 23, a switch/display unit 24, an image memory 25, and a URL-attached mail generator 26. The network facsimile apparatus 2 further includes a list/report generator 27, an HTML (hyper text markup language) page generator 28, an address conversion table 29, a LAN (local area network) communications controller 30, a printer 31, a scanner 32, an encoding/decoding unit 33, a communications controller 34, a modem 35, a network controller 36, and a system bus 37.

The CPU 20 controls the entire operation of the network facsimile apparatus 2, in accordance with control programs stored in the ROM 21 and using a memory region of the RAM 22 as a data handling space. The ROM 21 stores the control programs to be performed by the CPU 20, and various kinds of data including information specific to the network facsimile apparatus 2 and necessary for the execution of the control programs. The ROM 21 also includes a font table (not shown) for storing information of various character codes and the corresponding font data. The CPU 20 accesses the font table in order to refer to the properties of character codes when executing a character-to-image conversion. The RAM 22 includes a memory region which is used as a data handling space for the CPU 1.

The timer controller 23 operates as a clock to maintain the real time including date and as a time counter to count various time periods in order to control time used in the network facsimile apparatus 2. Operating as the time counter, the timer 23 can detect an elapsed-time and send an interruption signal to the CPU 1 upon such a detection.

The switch and display unit 24 includes various kinds of operational keys (not shown) and indicators (not shown) for interfacing between an operator and the network facsimile apparatus 2. The operational keys include, for example, a numeric keypad for entering the numbers such as a facsimile number of a destination facsimile terminal, a start key for sending an instruction for starting transmission, and a stop key for sending an instruction for stopping an operation being executed. Further, the operational keys include a single-touch-dialing mode key for changing a dialing mode from an ordinary dialing mode to a single-touch-dialing mode in which an operator can designate a registered destination facsimile number by pressing only a specified key. Further, the operational keys include a short-cut-dialing mode key for changing the dialing mode into a short-cut-dialing mode so as to make use of a dialing a short-cut-number pertinent to a registered destination facsimile terminal. The indicator of the switch and display unit 24 includes, for example, an LCD (liquid crystal display) for displaying various kind of status information and messages for the operator.

The image memory 25 stores image information for several purposes. For example, image information read by the scanner 32 is stored as a temporary file in the image memory 25 so as to be transmitted therefrom in a so-called memory transmission operation. Image information received from a facsimile terminal is also stored as a temporary file in the image memory 25 so as to be printed by the printer 31. Image information to be transmitted and which has been received via the network facility 5 are also stored in the image memory 25 as a temporary file. In addition, the image memory 25 stores temporary files composed of various kinds of data through the facsimile communications operations.

The URL-attached mail generator 26 generates an electronic mail that has an attachment of URL (universal resource locator) information indicating a location of a web page. The list/report generator 27 generates a list and a report in predetermined formats, based on information registered in the system network facsimile apparatus 2. The HTML page generator 28 generates an HTML (hyper text markup language) page based on the character information of the list and the report generated by the list/report generator 28. The address conversion table 29 is a memory that forms a table for converting a sub-address, which is sent from a facsimile terminal through the Group 3 facsimile protocol, into a corresponding electronic mail address that is pertinent to one of the client terminals 4a and 4b within the LAN 1a. An example of the address conversion table 29 is shown in FIG. 4, which is explained later.

The LAN communications controller 30 of FIG. 2 is connected to the network facility 5, and responsive to the Ethernet for the physical and data link layers and to the TCP/IP protocol for the network and transport layers. The LAN communications controller 30 performs data transmission operations. For example, the LAN communications controller 30 receives data from the CPU 20 and transmits the data to the communications network 1 through the communications on the TCP/IP. Also, the LAN communications controller 27 receives data from the communications network 1 through the communications on the TCP/IP and transmits the data to the CPU 20.

The printer 31 produces an image output at a predetermined line density in accordance with the image information, which is transmitted from an external machine such as a facsimile terminal, a different network facsimile apparatus, or a client terminal or which is read by the scanner 32. The scanner 32 reads an image of a document at a selected line density (resolution) from among the predetermined line densities (resolution) including 3.85 lines per mm, 7.7 lines per mm, and 15.4 lines per mm, for example.

The encoding/decoding unit 33 compresses image information which is to be transmitted, with a predetermined encoding method, and decompresses image information which is received, with a predetermined decoding method corresponding to the predetermined encoding method. The encoding/decoding methods used by the encoding/decoding unit 33 conform to the Group 3 facsimile communications procedure and may be an MH (modified huffman) method, an MR (modified READ (relative element address designate)) method, an MMR (modified modified READ (relative element address designate)) method, or the like.

The communications controller 34 controls the modem 35 and the network controller 36 to perform a facsimile communications operation in accordance with a facsimile communications protocol, preferably a Group 3 facsimile communications protocol. The modem 35 includes a facsimile modem function which preferably conforms to a Group 3 facsimile communications procedure so as to modulate data which is transmitted to the PSTN 13 via the network controller 36 and to demodulate data which is sent via the network controller 36 from the PSTN 13. Further, the modem 35 sends a DTMF (dial tone multi-frequency) signal which corresponds to the facsimile number entered.

The network controller 36 is connected to the PSTN 13 and controls the line connection of the network facsimile apparatus 2. Specifically, the network controller 36 connects and disconnects the line through which the direct current forms a loop when the line is connected. Also, the network controller 36 detects various events such as an inverse of the line polarity, disconnection of the line, a dial tone, a busy (speech) tone, a calling signal, and so forth. Further, the network controller 36 generates dialing pulses in accordance with the facsimile numbers entered through the switch and display unit 24. The system bus 37 provides connections between the above-described units of the network facsimile apparatus 2 so that these units can communicate with each other.

In the way as described above, one of the preferred configurations is provided to the network facsimile apparatus 2 of the LAN 1a. Such a network facsimile apparatus 2 is capable of communicating with the facsimile terminals, including the facsimile terminals 14a and 14b, via the PSTN 13 through the Group 3 facsimile communications protocol.

Figure 3A:
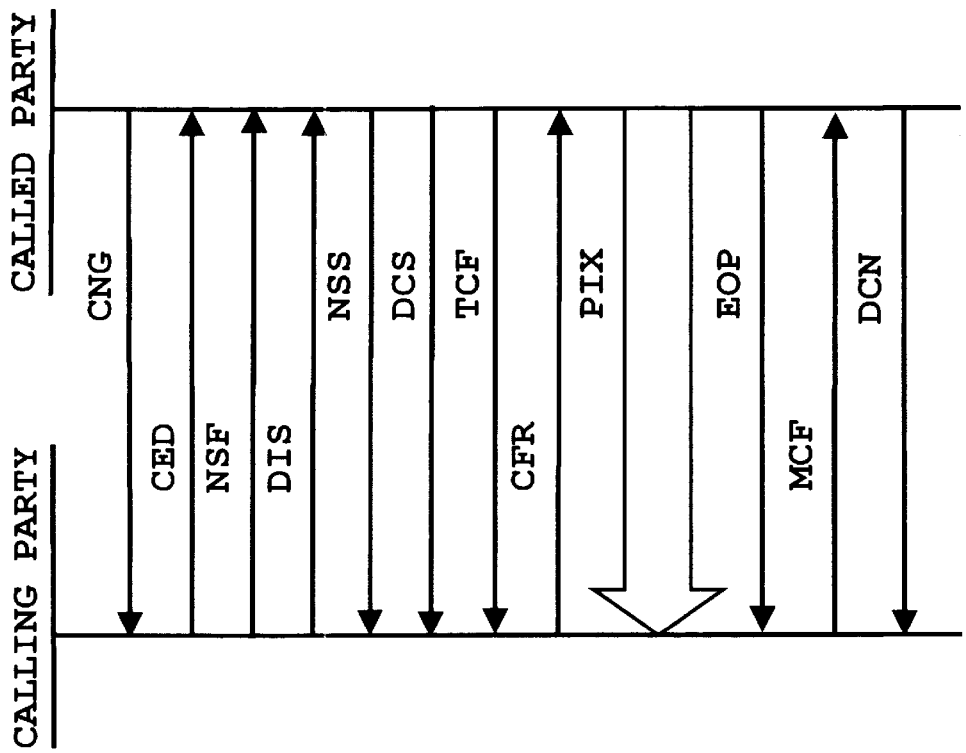
FIGS. 3A and 3B are illustrations for explaining information transmission procedures between a facsimile terminal and the network facsimile apparatus of FIG. 2 and between a data terminal and the network facsimile apparatus of FIG. 2, respectively.
Figure 3B:
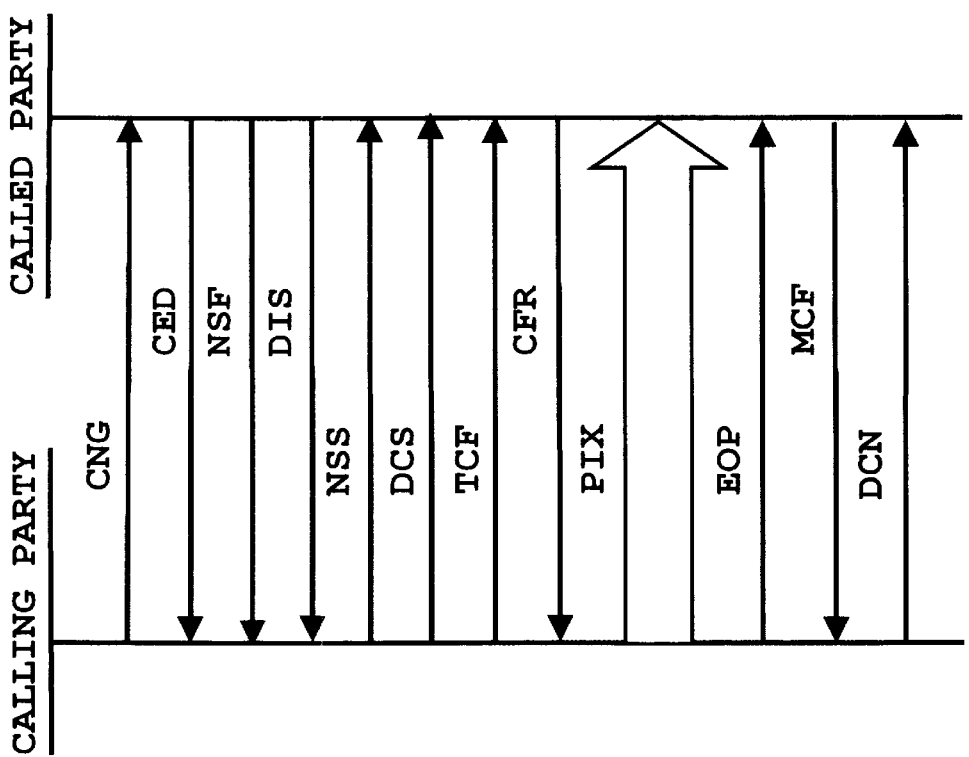

Next, an exemplary procedure of the image information transmission between a facsimile terminal and the network facsimile apparatus 2 via the PSTN 13 is explained with reference to FIGS. 3A and 3B. FIG. 3A explains a case of an image information transmission from a facsimile terminal on the PSTN 13 to the network facsimile apparatus 2. FIG. 3B shows a similar case but which exchanges the calling party and the called party. Therefore, only the operation of FIG. 3A is described below and a separate detailed description of FIG. 3B is omitted for the sake of simplicity.

To send image information, a calling party, for example, the facsimile terminal 14a, initiates a call to a called party which, in this example, is the network facsimile apparatus 2. The PSTN 13 establishes a closed line between the facsimile terminal 14a and the network facsimile apparatus 2 when the network facsimile apparatus 2 accepts the call from the facsimile terminal 14a.

Then, as shown in FIG. 3A, the facsimile terminal 14a sends a CNG (calling tone) signal to the network facsimile apparatus 2 in order to declare that the calling facsimile terminal 14a is a facsimile machine. The network facsimile apparatus 2 responds to the CNG signal by sending back a CED (called station identification) signal for declaring that the called network facsimile apparatus 2 is a facsimile machine and ready to receive signals. The network facsimile apparatus 2 notifies the facsimile terminal 14a of its own communications capabilities by sending NSF (non-standard facilities) and DIS (digital identification signal) signals.

The facsimile terminal 14a determines functions to be used for sending the image information, based on the NSF and DIS signals from the network facsimile apparatus 2, and informs the network facsimile apparatus 2 of the determined functions by sending NSS (non-standard facilities set-up) and DCS (digital command signal) signals to the facsimile terminal 14a. Then, the facsimile terminal 14a sends a TCF (training check) signal to the network facsimile apparatus 2 in order to perform a modem training at a modem speed which is used for sending the image information.

After a successful completion of the modem training, the network facsimile apparatus 2 returns a CFR (confirmation to receive) signal to the facsimile terminal 14a and becomes ready to receive image information. Upon receiving the CFR from the network facsimile apparatus 2, the facsimile terminal 14a starts to send a PIX (picture transmission) signal that includes image information, to the network facsimile apparatus 2 at the modem speed which is used in the training operation. Then, after completing the PIX signal, the facsimile terminal 14a sends an EOP (end of procedure) for indicating an end of the transmission procedure to the network facsimile apparatus 2.

The network facsimile apparatus 2 checks if the PIX signal received from the facsimile terminal 14a includes image information in an appropriate condition. If the network facsimile apparatus 2 determines that the PIX signal includes image information in an appropriate condition, the network facsimile apparatus 2 sends an MCF (message confirmation) back to the facsimile terminal 14a. Upon receiving the MCF signal, the facsimile terminal 14a sends a DCN (disconnect) for commanding disconnection of the line to the network facsimile apparatus 2. Then, both facsimile terminal 14a and the network facsimile apparatus 2 disconnect the line to end the communications session.

According to the Group 3 facsimile communications procedure, if the user of the facsimile terminal 14a desires to send image information to a data terminal such as the client terminal 4a of the LAN 1a, for example, the user can carry out such a transmission on the facsimile terminal 14a using a sub-address of the client terminal 4a. More specifically, during the above-described communications procedure, the facsimile terminal 14a sends such a sub-address of the client terminal 4a to the network facsimile apparatus 2 using the DCS signal.

If the network facsimile apparatus 2 finds sub-address information in the DCS signal received from the facsimile terminal includes, the network facsimile apparatus 2 recognizes that the facsimile terminal 14a is requesting an operation for transferring the image information to a destination data terminal which is addressed by the sub-address information included in the DCS signal. Such a request for transferring image information from the facsimile terminal to a data terminal on the LAN is referred to as a FAX-to-LAN transfer request, and the image information to be transferred for this case is referred to as FAX-to-LAN transfer-requested image information.

When the network facsimile apparatus 2 receives the DCS signal that includes the sub-address information, the network facsimile apparatus 2 converts the sub-address information into a corresponding electronic mail address specifying the destination data terminal, using the address conversion table 29 of FIG. 4. As shown in FIG. 4, the address conversion table 29 includes a plurality of pairs of sub-address (e.g. 0001) and corresponding E-mail address (e.g. mori@abcd.vwxyz.co.jp). Users may add and change data of the address conversion table 29 directly on the network facsimile apparatus 2 through the switch and display unit 24 thereof, or even on the client terminals 4a or 4b or the server 5 of the LAN 1a using an appropriate application software for handling data of such an address conversion table 29.

After converting the address, the network facsimile apparatus 2 transfers the received image information to the destination data terminal using the electronic mail address converted from the sub-address, through a transfer procedure which is explained later. In this procedure, one sub-address of the address conversion table 29 may specify a plurality of destination data terminals. In the example being explained, the sub-address, the DCS signal, and the address conversion table are used for specifying a destination communications terminal which is located within a local area network.

On the other hand, the user of the client terminal (e.g. client terminal 4a) can carry out an image information transmission from the client terminal to the facsimile terminal (e.g. facsimile terminal 14a) via the network facsimile apparatus 2. In this case, the client terminal 4a, for example, sends an electronic mail that is generated in accordance with the MIME format to the network facsimile apparatus 2. Upon receiving such an electronic mail, the network facsimile apparatus 2 decodes the electronic mail into readable image information and extracts a facsimile number of the facsimile terminal 4a from a header of the electronic mail. Then, the network facsimile apparatus 2 transfers the image information to a facsimile terminal using the facsimile number. Such a request for transferring image information from the data terminal on the LAN to the facsimile terminal is referred to as a LAN-to-FAX transfer request, and the image information to be transferred for this case is referred to as LAN-to-FAX transfer-requested image information.

Figure 5:
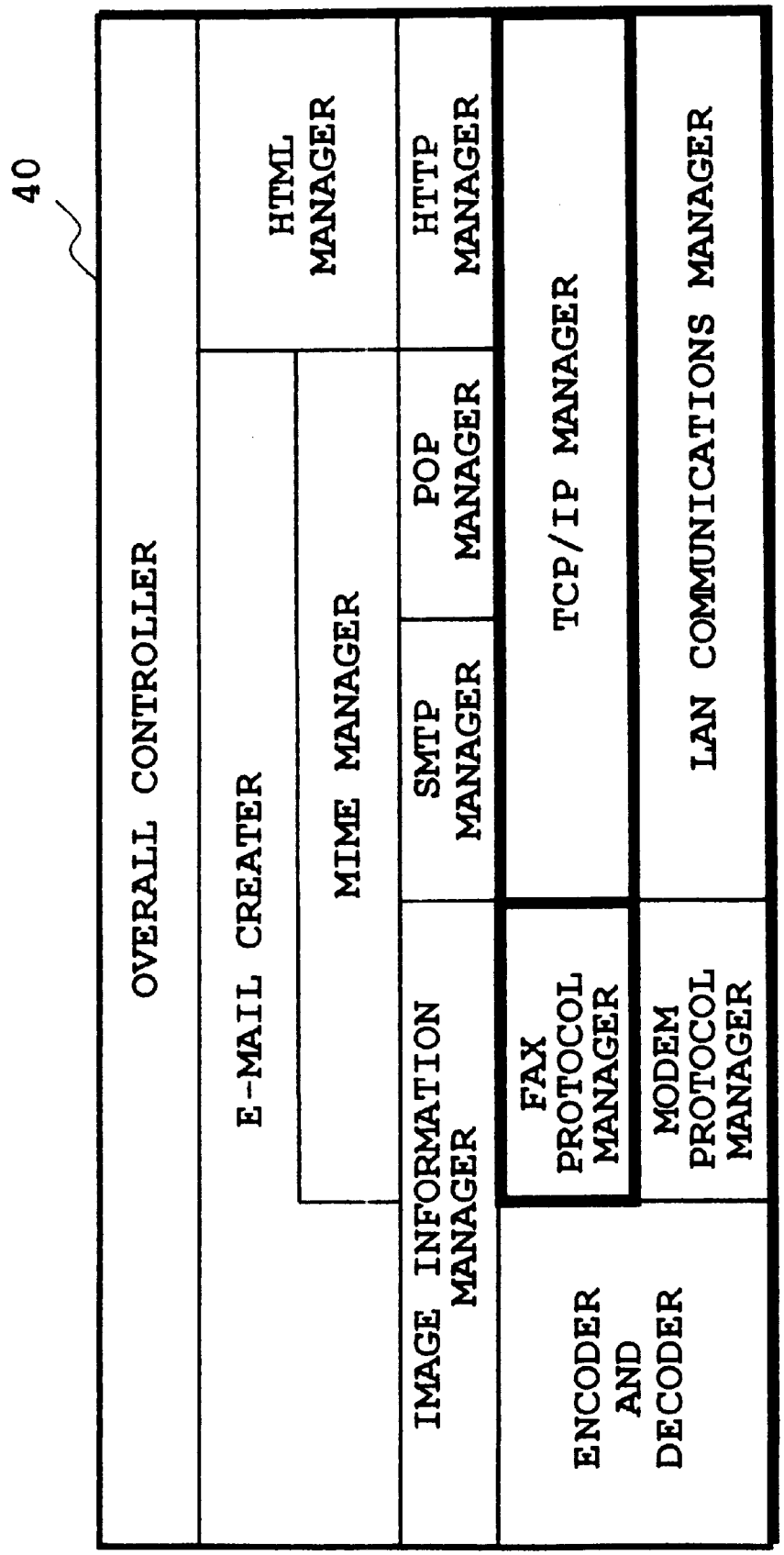
FIG. 5 is a diagram for explaining an exemplary configuration of software programs used in the network facsimile apparatus of FIG. 2.

Next, an exemplary software configuration of the network facsimile apparatus 2 will be explained with respect to FIG. 5. The network facsimile apparatus 2 is provided with a software system 40 including a plurality of software programs. An exemplary configuration of the software system 40 is illustrated in FIG. 5. As indicated by the thick lines in FIG. 5, main programs of the software system 40 are two protocol stacks; a FAX protocol manager for controlling the facsimile communication via the PSTN 13 and a TCP/IP (transmission control protocol/Internet protocol) manager for controlling the data communication via the network facility 5.

The FAX protocol manager of FIG. 5 is a facsimile communications control program, used by the modem 35, for controlling the facsimile communications procedures in accordance with the Group 3 facsimile protocols conforming to the T-30 recommendation of ITU-T (International Telecommunication Union-Telecommunications). A modem manager is a data modulation and demodulation control program, also used by the modem 35, for transmitting and receiving facsimile data via the PSTN 13. Encoder and decoder are data encoding and decoding programs, used by the encoding/decoding unit 33 for compressing and decompressing image information according to the T-4 recommendation of ITU-T.

An image information manager is a program used by the CPU 20 for storing image information. The TCP/IP manager is a data communications control program, used by the LAN communications controller 30, for controlling the data communications procedures via the network facility 5 according to the TCP/IP. A LAN (local area network) communications manager is a program, also used by the modem 35, for transmitting and receiving data through the network facility 5.

A MIME (multi-purpose Internet mail extensions) manager is a data conversion program according to the MIME, used by the CPU 20, for encoding data such as binary image data into text data for E-mail and for decoding E-mail text data back to original data. An SMTP (simple mail transfer protocol) manager is a simple mail transfer program according to the SMTP, used by the CPU 20, for transferring E-mail by the TCP/IP communications through the network facility 5, with which the network facsimile apparatus 2 can transfer image information to a client terminal (e.g. client terminal 4a) on the communications network 1. An E-mail creator is a program used by the CPU 20 for creating E-mail by creating and adding a mail header in accordance with the SMTP and MIME to the contents and which are composed of ordinary text data and/or text data encoded from image information with the MIME manager.

A POP (post office protocol) manager is a mail receiving program according to the POP, used by the CPU 20, for regularly accessing the POP server 3, and obtaining E-mails when the POP server 3 stores any E-mail in a mail box thereof assigned for the network facsimile apparatus 2. An HTTP (hyper text transfer protocol) manager is a hyper text transfer program according to the HTTP, used by the CPU 20, for transferring information in the HTML (hyper text markup language) format, which is used in the home page browsing services available through the communications network 1.

An HTML (hyper text markup language) converter is a text conversion program according to the HTML, used by the CPU 20, for converting data, such as a communications history report (explained later) which is transferred by the HTTP (hyper text transfer protocol) communications, using the HTML (hyper text markup language) format. An overall controller is a program, used by the CPU 20, for operatively integrating the operations performed by the above-described programs and controlling a user interface through the switch and display unit 24.

Next, an exemplary operation of handling the FAX-to-LAN transfer request is explained with reference to FIG. 6. In this operation, the network facsimile apparatus 2 first determines if a call received is for the FAX-to-LAN transfer request from a facsimile terminal (e.g. facsimile terminal) or the LAN-to-FAX transfer request from a data terminal (e.g. client terminal 4a).

Figure 6:
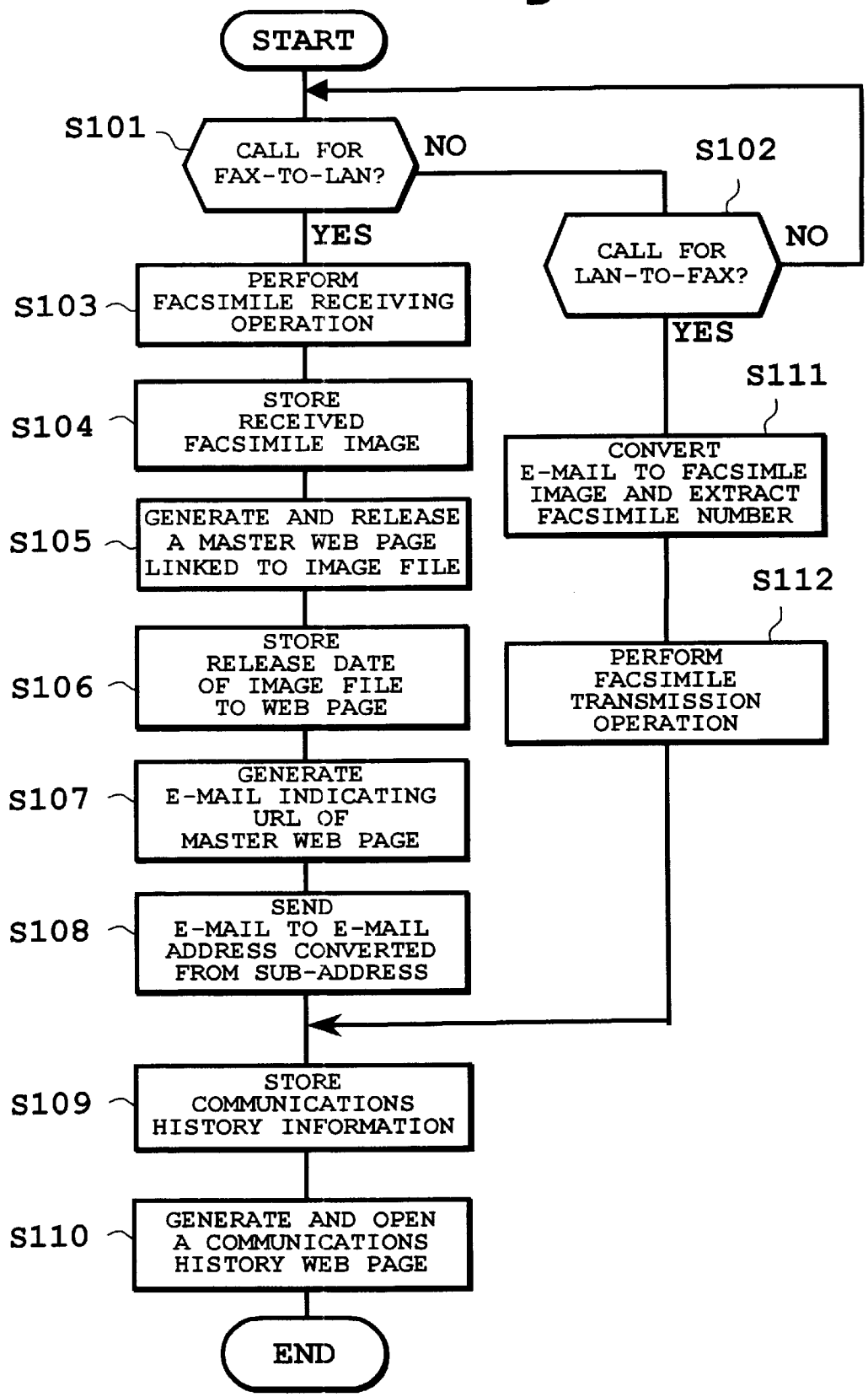
FIG. 6 is a flowchart for explaining an exemplary operation for handling FAX-to-LAN and LAN-to-FAX image files of the network facsimile apparatus of FIG. 2.

In Step S101 of FIG. 6, the CPU 20 of the network facsimile apparatus 2 checks if the call received is the FAX-to-LAN transfer request from the facsimile terminal 14a via the PSTN 13. If the call is not the FAX-to-LAN transfer request from the facsimile terminal 14a, the CPU 20 checks in Step S102 if the call is the LAN-to-FAX transfer request from the client terminal 4a via the network facility 5. With a waiting loop formed by NOs of Steps S101 and S102, the checks will be continued until the CPU 20 detects either one of the FAX-to-LAN transfer request from the facsimile terminal 14a or the LAN-to-FAX transfer request from the client terminal 4a. When the call is detected as the FAX-to-LAN transfer request from the facsimile terminal 14a and the check result of Step S101 is YES, the CPU proceeds to Step S103 where the CPU 20 instructs the communications controller 34, the modem 35, and the network controller 36 to perform a facsimile receiving operation for receiving FAX-to-LAN image information in accordance with the communications procedure of FIG. 3A.

Upon completing the facsimile receiving operation, the CPU 20 stores the FAX-to-LAN image information received from the facsimile terminal 14a into the image memory 25 as a FAX-to-LAN image file, in Step S104. Then, in Step S105, the CPU 20 instructs the list/report generator 27 and the HTML page generator 28 to renew a master web page 41 (FIG. 7) with the information of the FAX-to-LAN image file which is stored in the image memory 25 in Step S104, and to release the renewed master web page 41 to the communications network 1. After Step S105, the user of the client terminals on the communications network 1 can access and browse the master web page 41 made in Step S105 by designating a URL (universal resource locator) of the master web page 41 using a WWW (worldwide web) browsing program or the like.

Then, in Step S106, the CPU 20 refers to the timer controller 23 to read date and time on which the master web page 41 has been released to the communications network 1 and stores the date and time into the RAM 22 with a link to the FAX-to-LAN image file stored in the image memory 25 in Step S104. In Step S107, the CPU 20 instructs the URL-attached mail generator 26 to generate an electronic mail that indicates a URL (universal resource locator) of the master web page 41 generated in Step S105. Then, in Step S108, the CPU 20 sends the electronic mail generated in Step S107 to the destination client terminal 4a using the electronic mail address which is converted from the subaddress sent from the facsimile terminal 14a through the FAX-to-LAN transfer request operation. By the process of Step S108, the user of the destination client terminal 4a is informed that the network facsimile apparatus 2 holds an incoming FAX-to-LAN image file sent for the destination client terminal 4a under the URL to which the client terminal 4a can access to receive the incoming FAX-to-LAN image file.

Then, in Step S109, the CPU 20 stores various kinds of communications history information such as the date and time of the image information transmission, related to the image information transfer operation, into a communications history table 42 (FIG. 8) which is formed in the RAM 22. Then, in Step S110, the CPU 20 instructs the list/report generator 27 to generate a communications history report (not shown) based on the information of the communications history table 42 in the RAM 22. Also, in Step S110, the CPU 20 instructs the HTML page generator 28 to generate a communications history web page 43 (FIG. 9) by converting the communications history report using the HTML. Further, in Step S110, the CPU 20 opens the communications history web page 43 to the communications network 1. After Step S110, the user of the client terminals on the communications network 1 can see the communications history web page 43 made in Step S110. Then, the CPU 20 ends the image information transfer operation.

If the call is detected as the LAN-to-FAX transfer request from the client terminal 4a in Step S102 and the check result of Step S102 is YES, the CPU proceeds to Step S111 and instructs the encoding/decoding unit 33 to decode the electronic mail received from the client terminal 4a into facsimile image information and to extract a facsimile number of the destination facsimile terminal 14a. Then, in Step S112, the CPU 20 instructs the communications controller 34, the modem 35, and the network controller 36 to perform a facsimile transmission operation for transmitting the LAN-to-FAX image information in accordance with the communications procedure of FIG. 3B.

Next, exemplary contents of the master web page 41, the communications history table 42, and the communications history web page 43, will be explained with reference to FIGS. 7–9. As shown in FIG. 7, the master web page 41 indicates a plurality of FAX-to-LAN image files with the corresponding file number and other predetermined items such as the receipt date and time for the users of the client terminal to identify the files. As each FAX-to-LAN image file underlined means that it is linked to the file entity stored in the image memory 25, the user can access the desired FAX-to-LAN image file by clicking the underlined file on the master web page. The master web page 41 also indicates a link to the communications history web page 43.

The communications history table 42 of FIG. 8 includes a plurality of serial-numbered communications history files, each of which represents a specific communications operation that has been performed and each of which includes in rows a plurality of communications history indices.

The plurality of communications history indices include a date for representing a date on which the operation is performed, a start time for representing a time when the operation is started, and a destination for representing a calling number of a destination machine. The destination is obtained from the electronic mail header in the case of the LAN-to-FAX transfer request and from the DCS signal in the case of the FAX-to-LAN transfer request. The information transfer operation indices further includes a mode for representing a communications mode that has been selected for the operation. One exemplary communication mode is a G3 for indicating that the operation is performed in accordance with the Group 3 facsimile protocol. Another exemplary communication mode is a G3ECM (Group 3 error correcting mode) indicating that the operation is performed in accordance with the Group 3 facsimile protocol with the ECM function.

The information transfer operation indices further includes a time for representing a communication time in seconds, for example, pages for representing numbers of pages which have been transferred, and a result for representing a communication result with an "OK" mark for a normal completion or a "NG" mark for an abnormal completion.

The communications history web page 43 of FIG. 9 is formed from the communications history report which is generated based on the communications history table 42 of FIG. 8, as described above.

Next, an exemplary operation of handling an information delivery request from a destination machine is explained with reference to FIG. 10. Upon receiving a FAX-to-LAN transfer request, as set forth in the operation of FIG. 6, the network facsimile apparatus 2 updates and releases two kinds of web pages to the communications network 1 and sends electronic mail to a client terminal (e.g. client terminal 4a) to which the FAX-to-LAN transfer request corresponds. As the electronic mail indicates the relevant URL of the master web page 41, the user of the client terminal 4a can access the master web page 41 by sending an information delivery request to the relevant URL under the HTTP protocol, using a WWW (worldwide web) browsing software program or the like, so as to check the incoming information.

Upon receiving the information delivery request for the master web page 41 from the client terminal 4a, the network facsimile apparatus 2 transmits the master web page 41 to the requester. Thereby, the user can see the master web page 41 and check the incoming information. During such web page browsing, the user of the client terminal 4a can further raise an information delivery request for requesting a delivery of the communications history web page 43 and/or the FAX-to-LAN image files.

In the example being explained, the master web page 41 indicates thereon a plurality of links for linking to a plurality of FAX-to-LAN image files and the communications history web page 43. Thereby, the user can raise further information delivery requests based on these links indicated on the master web page 41. Also, in a similar manner, the communications history web page 43 indicates thereon a link to the master web page 41 in order for the user to return to the master web page 41. Accordingly, in this exemplary operation, the network facsimile apparatus 2 first checks if it receives the information delivery request for the master web page 41, and then performs the following operation for handling the information delivery request.

Figure 10:
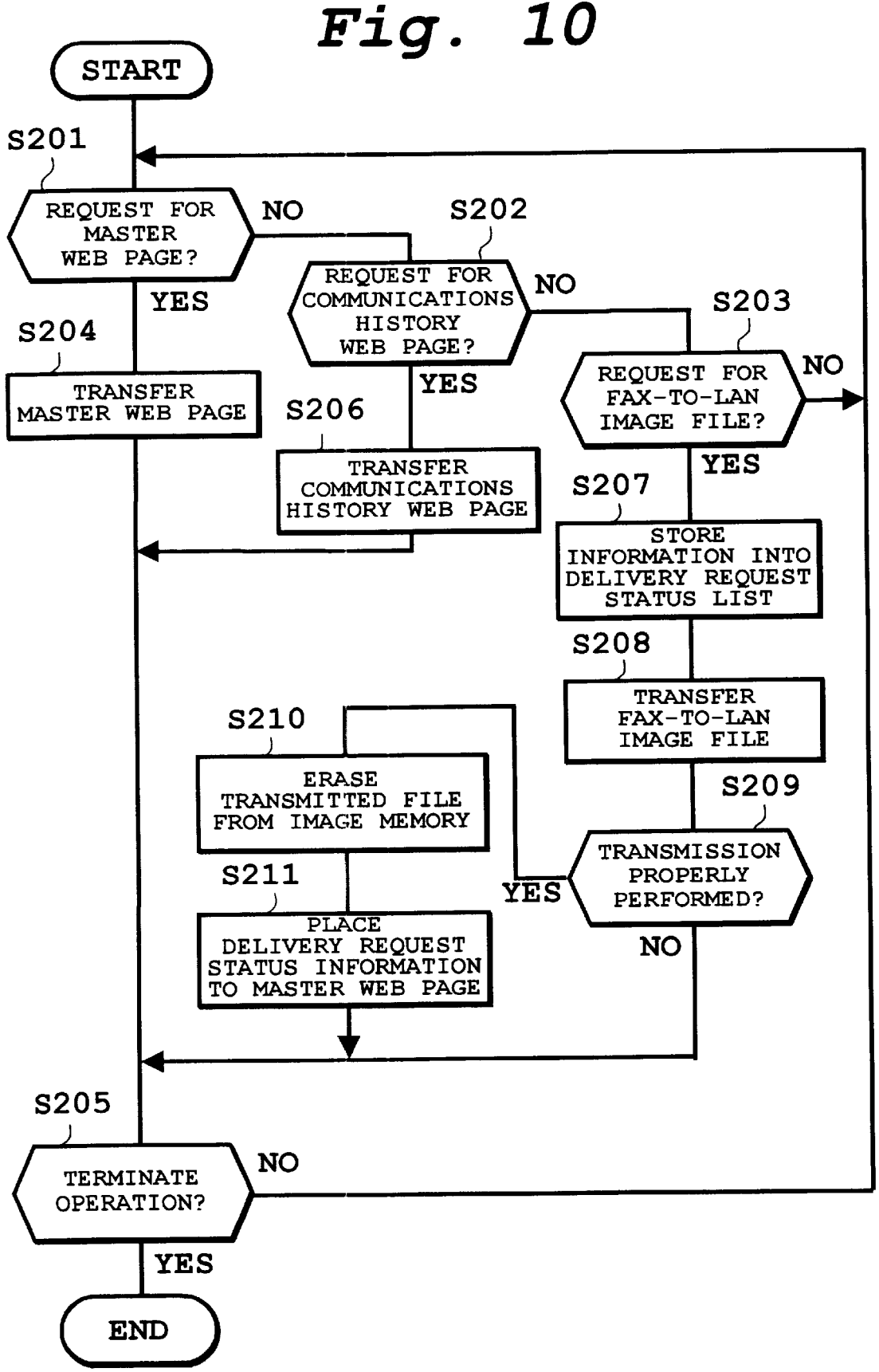
FIG. 10 is a flowchart for explaining an exemplary operation for handling a FAX-to-LAN delivery request of the network facsimile apparatus of FIG. 2.

In Steps S201, S202, and S203 of FIG. 10, the CPU 20 of the network facsimile apparatus 2 checks if it receives the information delivery requests for the master web page 41, the communications history web page 43, and the FAX-to-LAN image file, respectively. A NO loop of Steps S201, S202, and S203 forms a request waiting loop in which the above-mentioned checks are continued until the CPU 20 detects one of these information delivery requests.

If the CPU 20 determines in Step S201 that the network facsimile apparatus 2 receives the information delivery request for the master web page 41 and the result of Step S201 therefore is YES, the CPU 20 transmits the master web page 41 to an IP (internet protocol) address of the requester, or the client terminal 4a, in Step S204. Then, in Step S205, the CPU 20 determines if the operation of handling the information delivery request needs to be terminated due to an occurrence of one of some prescribed events such as, for example, a serious machine trouble of the network facsimile apparatus 2, a power-off, and so forth.

Unless one of these prescribed events occurs, the CPU 20 normally continues the information delivery request handling operation in order to be ready to receive further requests from the client terminal 4a. If the result of Step S205 turns to YES due to the above-described occurrence, the CPU 20 ends the operation. However, as described above, the CPU 20 normally continues the operation and sets the result of Step S205 to NO so as to return to Step S201 to reenter into the request waiting loop. After Step S204 of this operation, the user of the client terminal 4a can see the master web page 41 on a display of the client terminal 4a and select link pages such as the communications history web page 43 and the FAX-to-LAN image file which is the image information received from the facsimile terminal 14a.

If the CPU 20 determines in Step S202 that the network facsimile apparatus 2 receives the information delivery request for the communications history web page 43 and the result of Step S202 therefore becomes YES, the CPU 20 transmits the communications history web page 43 to the client terminal 4a using the IP (Internet protocol) address, in Step S206. Then, the CPU 20 proceeds to Step S205 to determine whether to enter again into the request waiting loop starting from Step S201 or to end the operation, as described above. If the result of Step S205 is NO and the operation returns to Step S201, the CPU 20 can be ready to receive further information delivery request from the client terminal 4a. After Step S206 of this operation, the user of the client terminal 4a can see the communications history web page 43 on the display of the client terminal 4a and select link pages such as the FAX-to-LAN image file which is the image information received from the facsimile terminal 14a.

If the CPU 20 determines in Step S203 that the network facsimile apparatus 2 receives the information delivery request for the FAX-to-LAN image file and the result of Step S203 therefore is YES, the CPU 20 proceeds to Step S207. In Step S207, the CPU 20 stores delivery request status information which relates to the information delivery request for the FAX-to-LAN image file, detected in Step S201, into a delivery request status list which is generated by the CPU 20 and maintained in the RAM 22. The delivery request status information stored into the delivery request status list in Step S207 includes various kinds of information such as an identification of the delivery-requested FAX-to-LAN image file, date and time on which the delivery-requested FAX-to-LAN image file is going to be executed, the IP address of the requester, and so on, for example.

Upon a completion of storing the delivery request status information, the CPU 20 transmits in Step S208 the FAX-to-LAN image file to the client terminal 4a using the IP address thereof through the FTP protocol. Then, the CPU 20 checks in Step S209 if the transmission of the FAX-to-LAN image file to the client terminal 4a in Step S208 is successfully completed. If the CPU 20 determines that the transmission of the FAX-to-LAN image file to the client terminal 4a in Step S208 is successfully completed and the result of Step S209 is YES, the CPU 20 erases the FAX-to-LAN image file which has been transmitted to the client terminal 4a, from the image memory 25 in Step S210.

Then, in Step S211, the CPU 20 places the delivery request status list on the master web page 41. After Step S211, the CPU 20 proceeds to Step S205. Then, the CPU 20 proceeds to Step S205 to determine whether to enter again into the request waiting loop starting from Step S201 or to end the operation, as described above.

In this way as described above, the network facsimile apparatus 2 can transmit the FAX-to-LAN image file to the destination client terminal 4a in response to the transfer request placed by the destination client terminal 4a, using the www which is a general-purposed and widely used service.

Further, the network facsimile apparatus 2 can avoid the concerns for information security and an endless increase of a used memory volume in the image memory 25 since the FAX-to-LAN image file is erased from the image memory 25 upon a completion of the transmission.

Further, the network facsimile apparatus 2 can allow the users of the client terminals of the communications network 1 to check the statuses of the FAX-to-LAN image files as the transfer request status list is provided to the master web page 41. This transfer request status list may be generated as a separate web page instead of being provided to the master web page 41.

Figure 11:
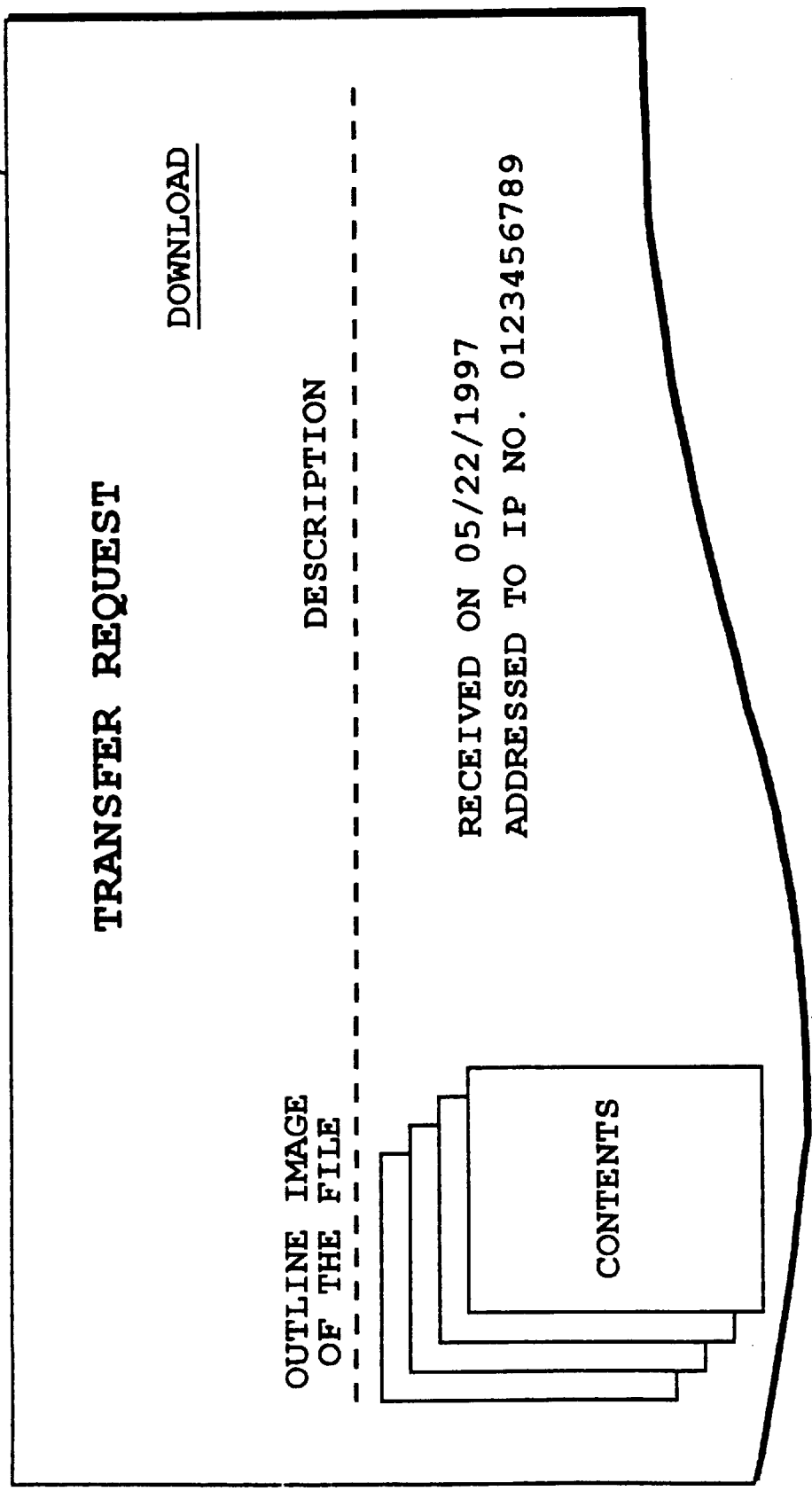
FIG. 11 is an exemplary form of a transfer-requested-file web page generated by the network facsimile apparatus of FIG. 2.

In FIG. 11, an exemplary file transfer web page 44 is illustrated. This file transfer web page 44 of FIG. 11 is transmitted to the client terminal 4a in place of the FAX-to-LAN image file which is supposed to be transmitted in response to the transfer request placed by the destination client terminal 4a. The file transfer web page 44 is linked to the image of the FAX-to-LAN image file requested, so that the user can recognize the contents with the file transfer web page 44 upon receipt. The file transfer web page 44 also indicates a description which includes the information such as the destination terminal and the like. The file transfer web page 44 also includes a download button. When the user of the destination client terminal 4a clicks the download button, the FAX-to-LAN image file is downloaded to the client terminal 4a.

With this file transfer web page 44, the users of the client terminals of the communications network 1 can use the www service with respect to the incoming FAX-to-LAN image file in a more convenient manner.

Figure 12:
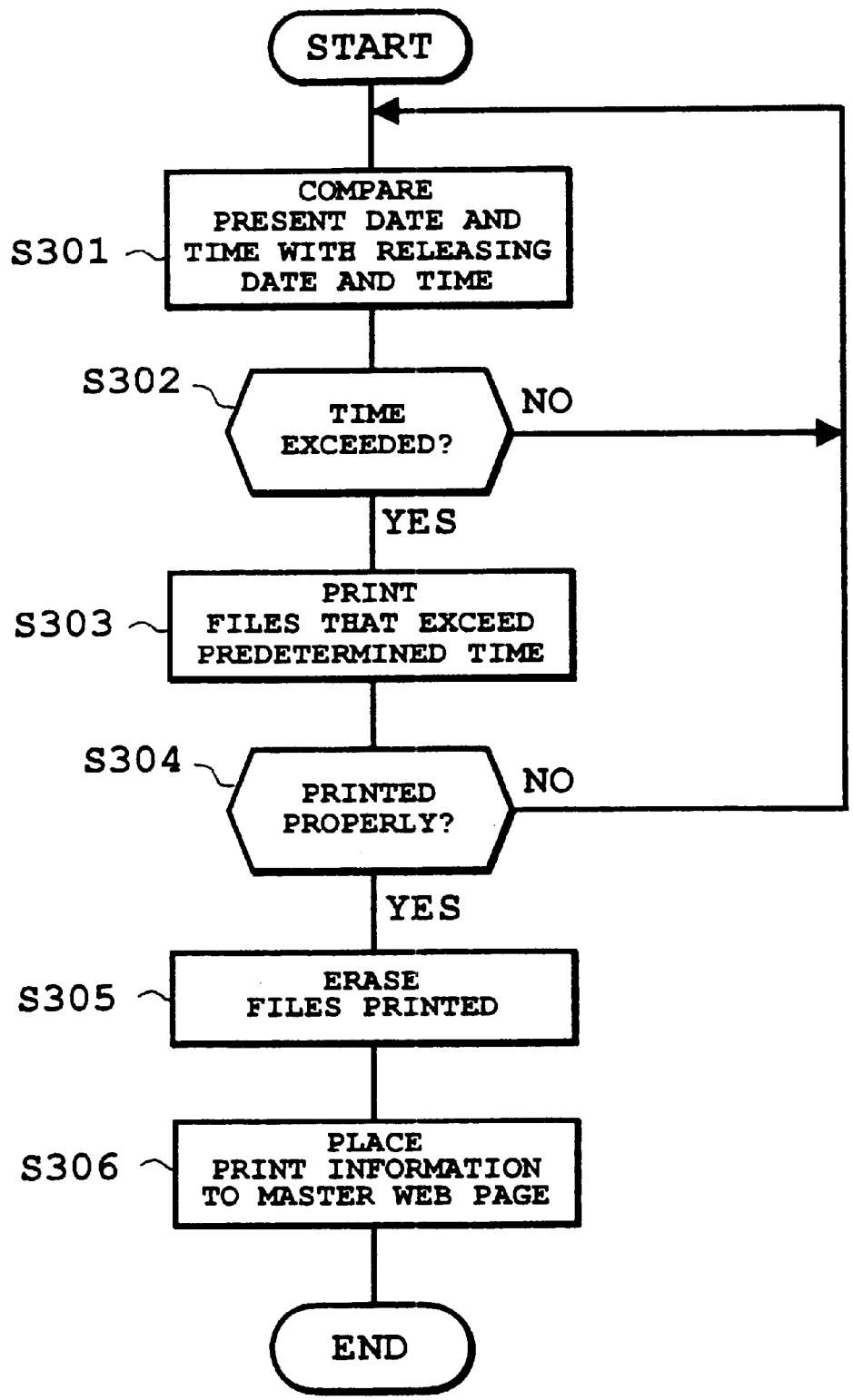
FIGS. 12 is a flowchart for explaining a time to erase the FAX-to-LAN image file in the network facsimile apparatus of FIG. 2.

Next, an exemplary operation of a received image file management is explained with reference to FIG. 12. In an exemplary operation of a received image file management shown in FIG. 12, the CPU 20 of the network facsimile apparatus 2 first compares, in Step S301, the present date and time to the receipt date and time of each of the FAX-to-LAN image files which are placed on the master web page 41 and released to the communications network 1. Then, in Step S302, the CPU 20 checks if the result of comparison made in Step S301 exceeds a predetermined time. If the CPU 20 determines that the comparison result made in Step S301 does not exceed the predetermined time, the process returns to Step S301 to repeat the Steps S301 and S302. If the CPU 20 determines that the comparison result made in Step S301 exceeds the predetermined time, the CPU 20 reads the corresponding FAX-to-LAN image files from the image memory 25 to print on the printer 31 or a network printer (not shown) connected to the LAN 1a, in Step S303.

Then, in Step S304, the CPU 20 checks if the printing in Step S303 is properly performed. If the CPU 20 determines that the printing in Step S303 is not properly performed, the CPU 20 returns the operation to Step S301 to repeat the operation again. If the CPU 20 determines that the printing in Step S303 is properly performed, the CPU 20 erases the FAX-to-LAN image files which are printed in Step S303 from the image memory 25, in Step S305. Then, in Step S306, the CPU 20 places the print information to the master web page 41 in order for the users of the client terminals connected to the communications network 1. The print information includes the FAX-to-LAN image file printed, the printer used, the print date and time, and so forth. Then, the CPU 20 ends the operation.

In this way as described above, the network facsimile apparatus 2 can avoid an event that certain FAX-to-LAN image files are stored in the image memory 25 for a relatively long period of time, and maintain a sufficient capacity in the image memory 25. At the same time, the network facsimile apparatus 2 can avoid an event that certain FAX-to-LAN image files are erased from the image memory 25 before transmission is performed for these files. The print information which is placed to the master web page 41 in Step S306 may alternatively be placed to a separate dedicated web page.

Figure 13:
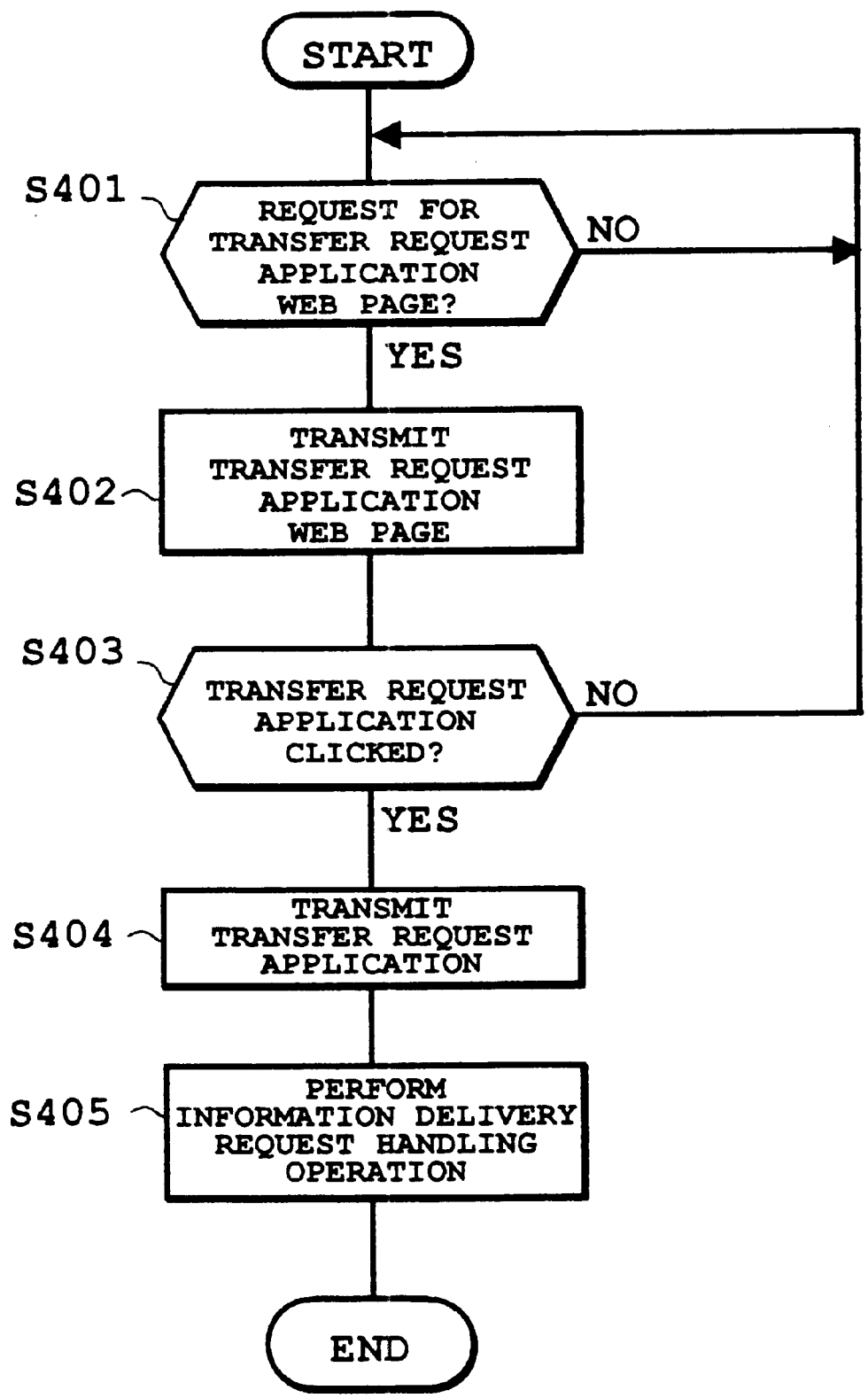
FIG. 13 is a flowchart for explaining a transmission of applications using a transfer request application web page in the network facsimile apparatus of FIG. 2.

Next, an exemplary operation for transmitting a transfer request application is explained with reference to FIG. 13. A transfer request application of FIG. 13 is used by the client terminals for sending the transfer request to the network facsimile apparatus 2, and is stored in the RAM 22 of the network facsimile apparatus 2. In this case, the network facsimile apparatus 2 is provided with a transfer request application web page (not shown) which has a link to the transfer request application stored in the RAM 22. The network facsimile apparatus 2 updates the transfer request application in accordance with the changes of functions and capabilities of the network facsimile apparatus 2, so that the user is allowed to access the most updated application through the transfer request application web page.

In Step S401 of FIG. 13, the CPU 20 checks if a request for transmitting the transfer request application web page is detected. If the CPU 20 determines that no request for transmitting the transfer request application web page is detected and the result of Step S401 is NO, the operation returns to Step S401 to continue the check. If the CPU 20 determines that a request for transmitting the transfer request application web page is detected and the result of Step S401 is YES, the CPU 20 transmits the transfer request application web page to the requester, in Step S402. Then, in Step S403, the CPU 20 further checks if an application button is clicked on the transfer request application web page. The check of Step S403 continues until the application button is clicked. If the CPU 20 determines that the application button is clicked and the result of Step S403 is YES, the CPU 20 transmits the application to the requester in Step S404. Then, in Step S405, the network facsimile apparatus 2 performs the information delivery request handling operation of FIG. 10, in which both network facsimile apparatus 2 and the client terminals uses the most updated transfer request application. After a completion of the information delivery request handling operation, the CPU 20 ends the operation.

With the thus-described method, the network facsimile apparatus 2 can revise the transfer request application without causing problems in performing the information delivery request handling operation due to differences of the transfer request application. In addition, the users of the client terminals of the communications network 1 can easily update the revisions of the transfer request application.

Next, a first exemplary modified operation of handling the information delivery request from a destination machine is explained with reference to FIG. 14. In this case, a client terminal (e.g. client terminal 4a) informs the network facsimile apparatus 2 of data conversion capability thereof when sending a request for the FAX-to-LAN image file. More specifically, when the client terminal 4a, for example, sends a request for the FAX-to-LAN image file, the network facsimile apparatus 2 can be informed of a plurality of acceptable data formats using, for example, an "accept:" field of a "request header" included in the request for the FAX-to-LAN image file according to the HTTP communications procedure. Thereby, the network facsimile apparatus 2 can convert the FAX-to-LAN image file stored in the image memory 25 into one of the data formats which are thus designated by the client terminal 4a.

Figure 14:
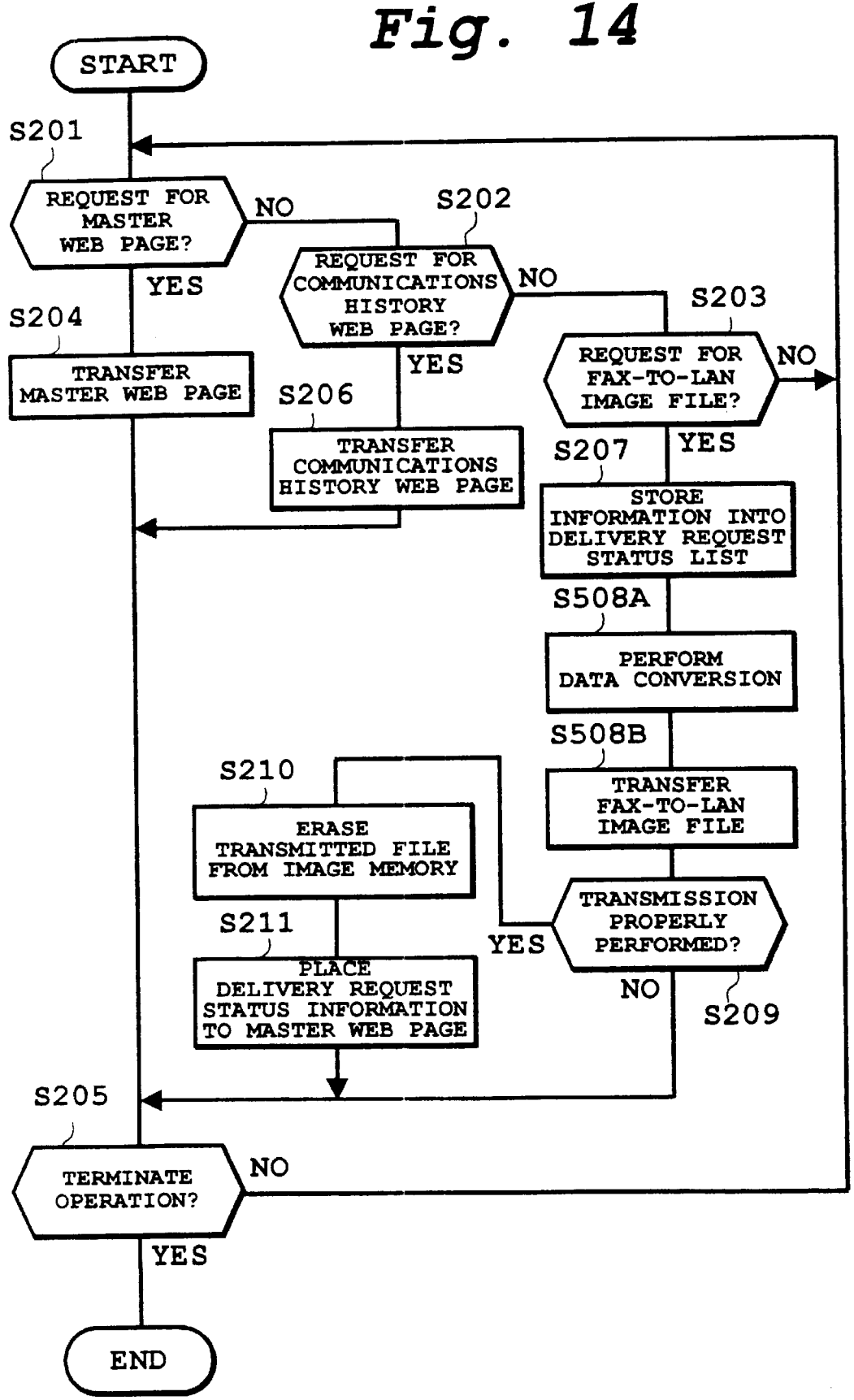
FIG. 14 is a flowchart for explaining a first exemplary modified operation for handling the FAX-to-LAN delivery request of the network facsimile apparatus of FIG. 2.

This first exemplary modified operation of FIG. 14 for handling the information delivery request is similar to that of FIG. 10, except for Steps S508A and S508B which replace Step S208 of FIG. 10. Therefore, in the following description of FIG. 14, only Steps S508A and S508B are described, and descriptions of all other steps which remain same are omitted.

In Step S508A of FIG. 14, the CPU 20 of the network facsimile apparatus 2 performs a data conversion operation in which the FAX-to-LAN image file is converted using a specific data format. This specific data format is designated by the client terminal 4a with the transfer request for the FAX-to-LAN image file which is detected in Step S203. Then, in Step S508B, the CPU 20 transmits the FAX-to-LAN image file which is converted in Step S508A to the client terminal 4a.

Next, a first exemplary modified operation of handling the FAX-to-LAN transfer request is explained with reference to FIGS. 15 and 16. In this case, the network facsimile apparatus is previously provided with a plurality of data format conversion programs such as tiff (tagged image file format), gif (graphics interchange format), jpeg (joint photographic experts group), and x-x bitmap formats, for example. When the network facsimile apparatus 2 receives FAX-to-LAN image information through a call for the FAX-to-LAN transfer request from a facsimile terminal (e.g. facsimile terminal 14a), the network facsimile apparatus 2 converts the received FAX-to-LAN image information into FAX-to-LAN image files using these data format conversion programs. After such a data conversion, the network facsimile apparatus 2 stores the FAX-to-LAN image file into the image memory 25. An exemplary file conversion result is shown in a file conversion list 45 of FIG. 15.

In general, when image data is converted using a different data format, an amount of resultant data varies depending typically upon both the contents of the image data and a data compression algorithm used in the different data format. For example, as shown in the file conversion list 45 of FIG. 15, the smallest data file of the file no. 001 is the tiff file which amounts to 39 KB and the second smallest data file is the gif file which amounts to 44 KB. Further, in a case of the file no. 002, the smallest data file is the gif file which amounts to 12 KB and the second smallest data file is the tiff file which amounts to 53 KB. Accordingly, if the network facsimile apparatus 2 searches and selects the smallest file for each file and sends it to a client terminal (e.g. client terminal 4a), the network facsimile apparatus 2 can decrease a time for transmitting such file to the client terminal 4a.

Figure 16:
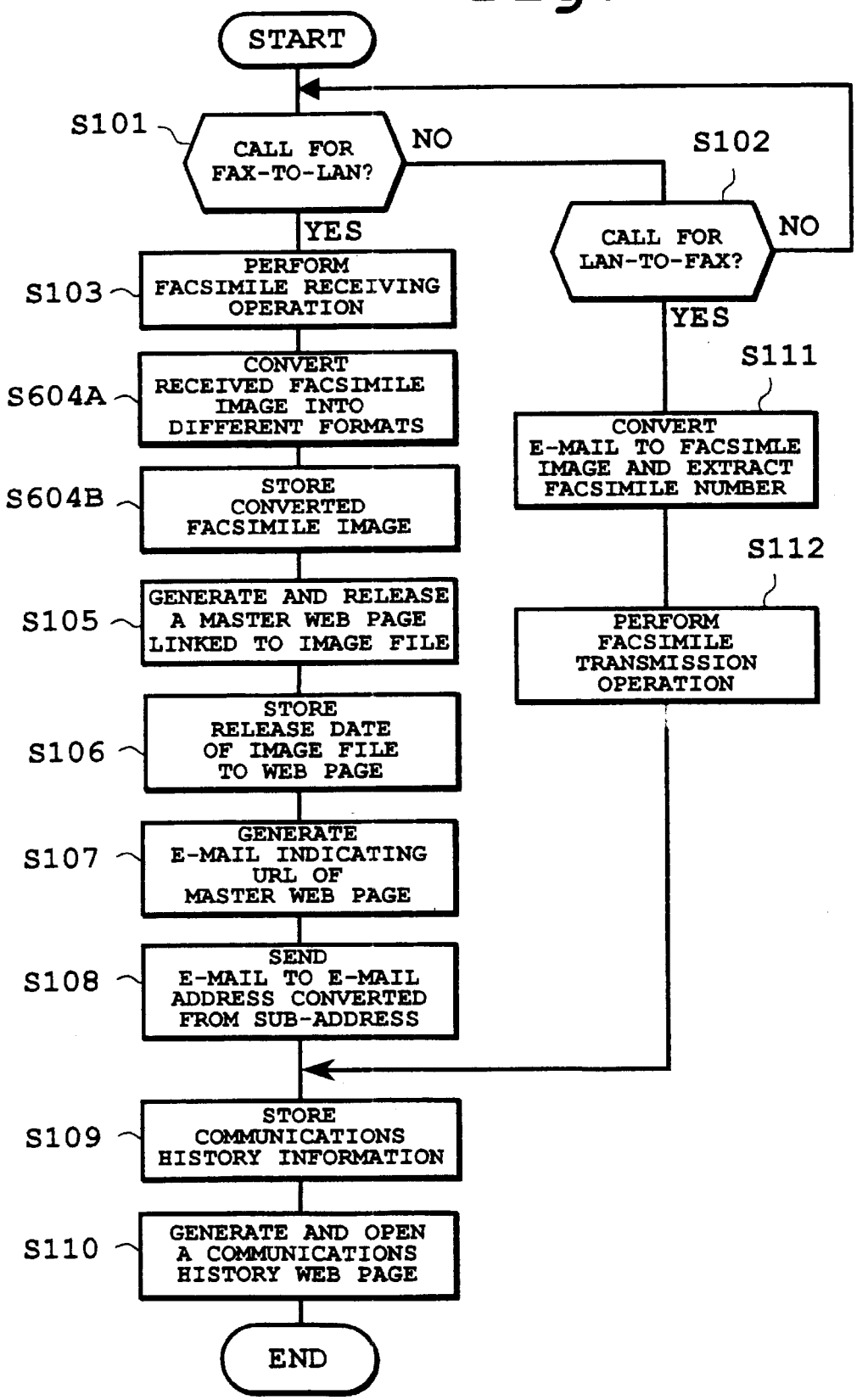
FIG. 16 is a flowchart for explaining a first exemplary modified operation for handling the FAX-to-LAN and LAN-to-FAX transfer requests of the network facsimile apparatus of FIG. 2.

This first exemplary modified operation of FIG. 16 for handling the FAX-to-LAN transfer request is similar to that of FIG. 6, except for Steps S604A and S604B which replace Step S104 of FIG. 6. Therefore, in the following description of FIG. 16, only Steps S604A and S604B are described, and descriptions of all other steps which remain the same are omitted.

In Step S604A of FIG. 16, the CPU 20 of the network facsimile apparatus 2 performs data conversion operations in which the incoming FAX-to-LAN image information is converted into four different data files using the tiff, gif, jpeg, and x-x bitmap data formats. Then, in Step S604B, the CPU 20 stores these four FAX-to-LAN image files into the image memory 25.

In conjunction with this first exemplary modified operation of FIG. 16 for handling the FAX-to-LAN transfer request, a second exemplary modified operation for handling the information delivery request is now described with reference to FIG. 17. In this case, the client terminal 4a informs the network facsimile apparatus 2 of data conversion capability thereof when sending a request for the FAX-to-LAN image file. Thereby, in accordance with the capability of the client terminal 4a, the network facsimile apparatus 2 can search and select the smallest data file from among four different-formatted FAX-to-LAN image files.

Figure 17:
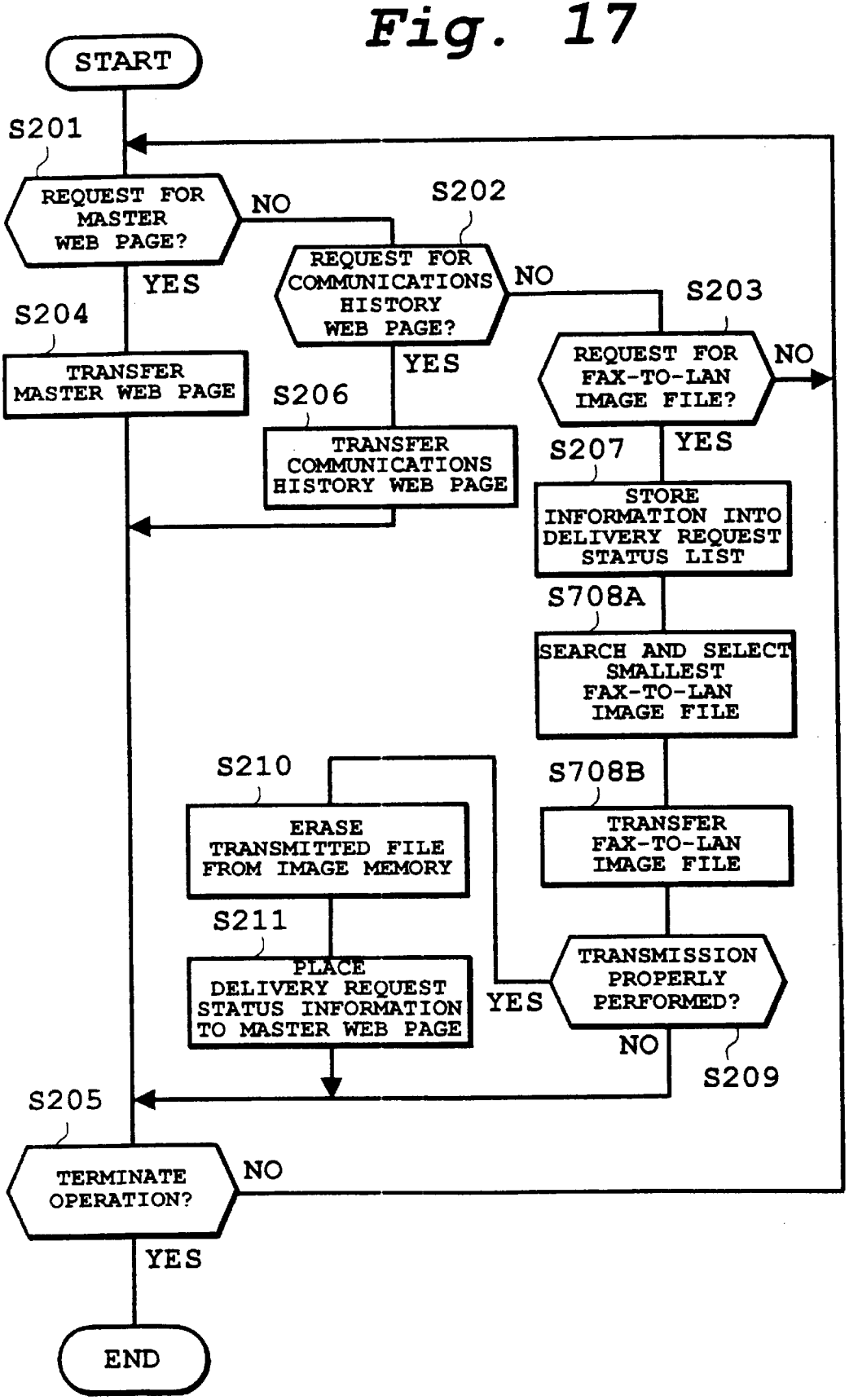
FIG. 17 is a flowchart for explaining another exemplary modified operation for handling the FAX-to-LAN delivery request of the network facsimile apparatus of FIG. 2.

This second exemplary modified operation of FIG. 17 for handling the information delivery request is similar to that of FIG. 10, except for Steps S708A and S708B which replace Step S208 of FIG. 10. Therefore, in the following description of FIG. 17, only Steps S708A and S708B are described, and descriptions of all other Steps which remain the same are omitted.

In Step S708A of FIG. 17, the CPU 20 of the network facsimile apparatus 2 searches and selects the smallest data file from among the four different-formatted FAX-to-LAN image files, which are converted in Step S604A of FIG. 16 and stored in the image memory 25 in Step S604B of FIG. 16, in accordance with the data conversion capability of the client terminal 4a. Then, in Step S708B of FIG. 17, the CPU 20 transmits the FAX-to-LAN image file, which is the smallest data file, to the client terminal 4a.

Based on the above-described second exemplary modified operation of FIG. 17 for handling the information delivery request, a further modification can be made, in which the network facsimile apparatus 2 may store the data format information of the previous FAX-to-LAN transfer request from a specific client terminal (e.g. client terminal 4a). One is the data formats which are informed as acceptable data formats from the specific client terminal (e.g. client terminal 4a). Another is the data format which is used for the file transmission in response to the previous FAX-to-LAN transfer request by the specific client terminal (e.g. client terminal 4a). A modified file conversion list 47, which is shown in FIG. 18, indicates that the network facsimile apparatus 2 recognizes the file no. 001, for example, has been transferred in the tiff format in the previous FAX-to-LAN image file transmission in which the tiff, gif, and jpeg are the acceptable data formats.

That is, if the network facsimile apparatus 2 receives a transfer request from a client terminal (e.g. client terminal 4a) for the file no. 001, for example, which has been transferred in the tiff format to the same client terminal in the previous image file transmission, the network facsimile apparatus 2 can recognize that the file no. 001 has been transferred in the tiff format to the same client terminal in the previous image file transmission. Then, the network facsimile apparatus 2 selects the tiff-formatted FAX-to-LAN image file without searching the smallest data file from among all the different-formatted data file of the file no. 001. Subsequently, the network facsimile apparatus 2 transmits the selected FAX-to-LAN image file to the client terminal. In this way, the network facsimile apparatus 2 can swiftly select the smallest data file to send to the client terminal.

The embodiment of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The present application may also be implemented by the preparation of application specific integrated circuits or by interconnecting an appropriate network of conventional component circuits, as will be readily apparent to those skilled in the art.

This document claims priority and contains subject matter related to Japanese Patent Application Nos. JPAP09-354090 filed on Dec. 9, 1997 and JPAP10-022549 filed on Jan. 21, 1998, the entire contents of which are herein incorporated by reference.

Numerous additional modifications and variations of the present application are possible in light of the above teachings. It is therefore to be understood that within the scope of the appended claims, the present application may be practiced otherwise than as specifically described herein.

What we claim is:

1. A communications terminal comprising:

a first memory that stores a transfer-request image file based on image information, which is sent through a transfer-request call from a facsimile terminal remote from said communication terminal, through a first predetermined communications procedure, said transfer-request call including a destination address;

an address conversion table that converts said destination address into at least one transfer address which individually corresponds to at least one data terminal remote from said communication terminal, said at least one data terminal coupled to a local area network;

a first web page generator that generates a first web page which includes a link to said transfer-requested image file stored in said first memory and that opens said first web page to said local area network;

an electronic mail generator that informs said at least one data terminal of said transfer-request image file by electronic mail using said at least one transfer address and through a second communications procedure, said electronic mail including a first web page locator;

a first communications controller that receives a first delivery request which is sent by said at least one data terminal, using said first web page locator and a predetermined web page browsing procedure, and that transmits said first web page to said at least one data terminal upon receiving said first delivery request; and a second communications controller that receives a second delivery request which is sent by said at least one data terminal through said first web page and that transmits said transfer-request image file to said at least one data terminal upon receiving said second delivery request.

2. The communications terminal of claim 1, further comprising a second web page generator that generates a second web page which is linked to said first web page and which indicates delivery statuses of said transfer-request image file and that opens said second web page to said local area network.

3. The communications terminal of claim 2, further comprising a delivery status manager that erases said transfer-request image file from said first memory when said second communications controller completes the transmission of said transfer-request image file to said at least one data terminal and that places delivery status information on said second web page.

4. The communications terminal of claim 2, further comprising:
   a second memory that stores date and time on which said transfer-request image file is opened to said local area network through said first web page;
   a print controller that performs a print operation in which said transfer-request image file is printed when a predetermined time passes from said date and time stored in said second memory;
   a third web page generator that generates a third web page which is linked to said first web page and which indicates print statuses of said transfer-request image file and that opens said third web page to said local area network; and
   a print status manager that erases said transfer-request image file from said first memory when said print controller completes said print operation of said transfer-request image file and that places print status information on said third web page.

5. The communications terminal of claim 4, further comprising:
   a third memory that stores a communications history for said transfer-request image file;
   a fourth web page generator that generates a fourth web page which includes links to said first web page and said communications history stored in said third memory and that opens said fourth web page to said local area network; and
   a third communications controller that receives a third delivery request which is sent by said at least one data terminal through said fourth web page and that transmits said communications history to said at least one data terminal upon receiving said third delivery request.

6. The communications terminal of claim 5, further comprising:
   a fourth memory that stores an application program;
   a fifth web page generator that generates a fifth web page which includes links to said first web page and said application program stored in said fourth memory and that opens said fifth web page to said local area network; and
   a fourth communications controller that receives a fourth delivery request which is sent by said at least one data terminal through said fifth web page and that transmits said application program to said at least one data terminal upon receiving said fourth delivery request.

7. The communications terminal of claim 5, wherein said third delivery request conform to a hyper text transfer protocol (HTTP).

8. The communications terminal of claim 6, wherein said application program is used by said at least one data terminal when sending said first, second, third, and fourth delivery request to said communications terminal via said local area network.

9. The communications terminal of claim 6, further comprising:
   a fifth communications controller that receives information with a transfer request from a data terminal coupled to said local area network, said transfer request including a transfer address which corresponds to a facsimile terminal,
   wherein said application program is used by said data terminal when sending said information with said transfer request to said communications terminal via said local area network and said fifth communications controller transmits said information with said transfer request to said facsimile terminal through said first predetermined communications procedure.

10. The communications terminal of claim 6, wherein said fourth delivery request conform to a hyper text transfer protocol (HTTP).

11. The communications terminal of claim 1, further comprising a data format converter that converts said transfer-request image file, and wherein said second communications controller receives information of acceptable data formats through the second delivery request from said at least one data terminal and instructs said data format converter to convert said transfer-request image file using a data format which matches said acceptable data formats, and transmits said converted transfer-request image file to said at least one data terminal.

12. The communications terminal of claim 11, wherein said second communications terminal receives said information of acceptable data formats in an accept field which is included in a request header of the second delivery request.

13. The communications terminal of claim 1, further comprising a data format converter that includes a plurality of different data formats and that converts said transfer-request image file stored in said first memory into a plurality of different-formatted transfer-request image files using said plurality of different data formats,
   and wherein said second communications controller receives information of acceptable data formats through the second delivery request from said at least one data terminal, searches and selects a file having a smallest data amount from among said plurality of different-formatted transfer-request image files of which data format matches said acceptable data formats, and transmits said selected transfer-request image file to said at least one data terminal.

14. The communications terminal of claim 13, wherein said first memory stores information of said acceptable data formats as a previously-accepted data format and said actually used data format as a previously-used data format during a previous transmission operation in response to said second delivery request which has been made previously, and wherein upon newly receiving said information of acceptable data formats which are equivalent to said previously-accepted data formats, said second communications controller selects said transfer-request image file in said previously-used data format, which matches one of said acceptable data formats, from among said plurality of different-formatted transfer-request image files stored in said first memory through said previous transmission operation, and transmits said selected transfer-request image file in said previously-used data format to said at least one data terminal.

15. The communications terminal of claim 14, wherein either one of when said acceptable data formats of said newly-received information are different from said previously-accepted data formats and when none of said previously-accepted data formats are stored in said first memory, said second communications controller searches and selects a file having a smallest data amount from among said plurality of different-formatted transfer-request image files of which data format conforms to said acceptable data formats of said newly-received information, and transmits said selected transfer-request image file to said at least one data terminal.

16. The communications terminal of claim 1, wherein said first web page is in accordance with a hyper text markup language (HTML).

17. The communications terminal of claim 1, wherein said predetermined web page browsing procedure, said first delivery request, and second delivery request conform to a hyper text transfer protocol (HTTP).

18. The communications terminal of claim 1, wherein said first predetermined communications procedure is a Group 3 facsimile procedure.

19. The communications terminal of claim 1, wherein said second predetermined communications procedure is at least one of a simple mail transfer protocol (SMTP), a multipurpose Internet message extensions (MIME), and a file transfer protocol.

20. A communications terminal comprising:
   first memory means for storing a transfer-request image file based on image information, which is sent through a transfer-request call from a facsimile terminal remote from said communication terminal, through a first predetermined communications procedure, said transfer-request call including a destination address;
   address conversion table means for converting said destination address into at least one transfer address which individually corresponds to at least one data terminal remote from said communication terminal, said at least one data terminal coupled to a local area network;
   first web page generating means for generating a first web page which includes a link to said transfer-requested image file stored in said first memory means and for opening said first web page to said local area network;
   electronic mail generating means for informing said at least one data terminal of said transfer-request image file by electronic mail using said at least one transfer address and through a second communications procedure, said electronic mail including a first web page locator;
   first communications controlling means for receiving a first delivery request which is sent by said at least one data terminal, using said first web page locator and a predetermined web page browsing procedure, and for transmitting said first web page to said at least one data terminal upon receiving said first delivery request; and
   second communications controlling means for receiving a second delivery request which is sent by said at least one data terminal through said first web page, and for transmitting said transfer-request image file to said at least one data terminal upon receiving said second delivery request.

21. The communications terminal of claim 20, further comprising a second web page generating means for generating a second web page which is linked to said first web page and which indicates delivery statuses of said transfer-request image file and for opening said second web page to said local area network.

22. The communications terminal of claim 21, further comprising a delivery status managing means for erasing said transfer-request image file from said first memory means when said second communications controlling means completes the transmission of said transfer-request image file to said at least one data terminal and for placing delivery status information on said second web page.

23. The communications terminal of claim 21, further comprising:
   second memory means for storing date and time on which said transfer-request image file is opened to said local area network through said first web page;
   print controlling means for performing a print operation in which said transfer-request image file is printed when a predetermined time passes from said date and time stored in said second memory means;
   third web page generating means for generating a third web page which is linked to said first web page and which indicates print statuses of said transfer-request image file and for opening said third web page to said local area network; and
   print status managing means for erasing said transfer-request image file from said first memory means when said print controlling means completes said print operation of said transfer-request image file and for placing print status information on said third web page.

24. The communications terminal of claim 23, further comprising:
   third memory means for storing a communications history for said transfer-request image file;
   fourth web page generating means for generating a fourth web page which includes links to said first web page and said communications history stored in said third memory means and for opening said fourth web page to said local area network; and
   third communications controlling means for receiving a third delivery request which is sent by said at least one data terminal through said fourth web page, and for transmitting said communications history to said at least one data terminal upon receiving said third delivery request.

25. The communications terminal of claim 24, further comprising:
   fourth memory means for storing an application program;
   fifth web page generating means for generating a fifth web page which includes links to said first web page and said application program stored in said fourth memory means, and for opening said fifth web page to said local area network; and
   fourth communications controlling means for receiving a fourth delivery request which is sent by said at least one data terminal through said fifth web page, and transmitting said application program to said at least one data terminal upon receiving said fourth delivery request.

26. The communications terminal of claim 24, wherein said third delivery request conform to a hyper text transfer protocol (HTTP).

27. The communications terminal of claim 25, wherein said application program is used by said at least one data terminal when sending said first, second, third, and fourth delivery request to said communications terminal via said local area network.

28. The communications terminal of claim 25, further comprising:
   fifth communications controlling means for receiving information with a transfer request from a data terminal coupled to said local area network, said transfer request including a transfer address which corresponds to a facsimile terminal,
   wherein said application program is used by said data terminal when sending said information with said transfer request to said communications terminal via said local area network and said fifth communications controlling means transmits said information with said transfer request to said facsimile terminal through said first predetermined communications procedure.

29. The communications terminal of claim 25, wherein said fourth delivery request conform to a hyper text transfer protocol (HTTP).

30. The communications terminal of claim 20, further comprising a data format converting means for converting said transfer-request image file, and wherein said second communications controlling means receives information of acceptable data formats through the second delivery request from said at least one data terminal and instructs said data format converting means to convert said transfer-request image file using a data format which matches said acceptable data formats, and transmits said converted transfer-request image file to said at least one data terminal.

31. The communications terminal of claim 30, wherein said second communications terminal receives said information of acceptable data formats in an accept field which is included in a request header of the second delivery request.

32. The communications terminal of claim 20, further comprising a data format converting means for including a plurality of different data formats and for converting said transfer-request image file stored in said first memory means into a plurality of different-formatted transfer-request image files using said plurality of different data formats, and wherein said second communications controlling means receives information of acceptable data formats through the second delivery request from said at least one data terminal, searches and selects a file having a smallest data amount from among said plurality of different-formatted transfer-request image files of which data format matches said acceptable data formats, and transmits said selected transfer-request image file to said at least one data terminal.

33. The communications terminal of claim 32, wherein said first memory means stores information of said acceptable data formats as a previously-accepted data format and said actually used data format as a previously-used data format during a previous transmission operation in response to said second delivery request which has been made previously, and wherein upon newly receiving said information of acceptable data formats which are equivalent to said previously-accepted data formats, said second communications controlling means selects said transfer-request image file in said previously-used data format, which matches one of said acceptable data formats, from among said plurality of different-formatted transfer-request image files stored in said first memory means through said previous transmission operation, and transmits said selected transfer-request image file in said previously-used data format to said at least one data terminal.

34. The communications terminal of claim 33, wherein either one of when said acceptable data formats of said newly-received information are different from said previously-accepted data formats and when none of said previously-accepted data formats are stored in said first memory means, said second communications controlling means searches and selects a file having a smallest data amount from among said plurality of different-formatted transfer-request image files of which data format conforms to said acceptable data formats of said newly-received information, and transmits said selected transfer-request image file to said at least one data terminal.

35. The communications terminal of claim 20, wherein said first web page is in accordance with a hyper text markup language (HTML).

36. The communications terminal of claim 20, wherein said predetermined web page browsing procedure, said first delivery request, and second delivery request conform to a hyper text transfer protocol (HTTP).

37. The communications terminal of claim 20, wherein said first predetermined communications procedure is a Group 3 facsimile procedure.

38. The communications terminal of claim 20, wherein said second predetermined communications procedure is at least one of a simple mail transfer protocol (SMTP), a multipurpose Internet message extensions (MIME), and a file transfer protocol.

39. A method of performing a relay operation for a communications terminal, comprising the steps of:

a first storing step that stores a transfer-request image file based on image information, which is sent through a transfer-request call from a facsimile terminal remote from said communication terminal, through a first predetermined communications procedure, said transfer-request call including a destination address;

converting said destination address into at least one transfer address which individually corresponds to at least one data terminal remote from said communication terminal, said at least one data terminal coupled to a local area network;

a first web page generating step that generates a first web page which includes a link to said transfer-requested image file stored by said first storing step;

a first web page opening step that opens said first web page to said local area network;

informing said at least one data terminal of said transfer-request image file by electronic mail using said at least one transfer address and through a second communications procedure, said electronic mail including a first web page locator;

a first receiving step that receives a first delivery request which is sent by said at least one data terminal, using said first web page locator and a predetermined web page browsing procedure;

a first transmitting that transmits said first web page to said at least one data terminal upon a receipt of said first delivery request;

a second receiving step that receives a second delivery request which is sent by said at least one data terminal through said first web page; and a second transmitting step that transmits said transfer-request image file to said at least one data terminal upon a receipt of said second delivery request.

40. The method of claim 39, further comprising a second web page generating step that generates a second web page which is linked to said first web page and which indicates delivery statuses of said transfer-request image file, and a second web page opening step that opens said second web page to said local area network.

41. The method of claim 40, further comprising an erasing step that erases said transfer-request image file stored by said first memory step when said second transmitting step completes the transmission of said transfer-request image file to said at least one data terminal, and a placing step that places delivery status information on said second web page.

42. The method of claim 40, further comprising the steps of:

a second storing step that stores date and time on which said transfer-request image file is opened to said local area network through said first web page;

printing said transfer-request image file when a predetermined time passes from said date and time stored by said second storing step;

a third web page generating step that generates a third web page which is linked to said first web page and which indicates print statuses of said transfer-request image file;

a third web page opening step that opens said third web page to said local area network;

erasing said transfer-request image file stored by said first memory step when said printing step completes; and placing print status information on said third web page.

43. The method of claim 42, further comprising the steps of:
   a third storing step that stores a communications history for said transfer-request image file;
   a fourth web page generating step that generates a fourth web page which includes links to said first web page and said communications history stored by said third storing step;
   a fourth web page opening step that opens said fourth web page to said local area network; and
   a third receiving step that receives a third delivery request which is sent by said at least one data terminal through said fourth web page; and
   a third transmitting step that transmits said communications history to said at least one data terminal upon a receipt of said third delivery request.

44. The method of claim 43, further comprising the steps of:
   a fourth storing step that stores an application program;
   a fifth web page generating step that generates a fifth web page which includes links to said first web page and said application program stored by said fourth storing step:
   a fifth web page opening step that opens said fifth web page to said local area network; and
   a fourth receiving step that receives a fourth delivery request which is sent by said at least one data terminal through said fifth web page; and
   a fourth transmitting step that transmits said application program to said at least one data terminal upon a receipt of said fourth delivery request.

45. The method of claim 43, wherein said third delivery request conform to a hyper text transfer protocol (HTTP).

46. The method of claim 44, wherein said application program is used by said at least one data terminal when sending said first, second, third, and fourth delivery request to said communications terminal via said local area network.

47. The method of claim 44, further comprising a fifth receiving step that receives information with a transfer request from a data terminal coupled to said local area network, said transfer request including a transfer address which corresponds to a facsimile terminal,
   wherein said application program is used by said data terminal when sending said information with said transfer request to said communications terminal via said local area network,
   said method further comprising a fifth transmitting step that transmits said information with said transfer request to said facsimile terminal through said first predetermined communications procedure.

48. The method of claim 44, wherein said fourth delivery request conform to a hyper text transfer protocol (HTTP).

49. The method of claim 39, further comprising a data format converting step that converts said transfer-request image file, and wherein said second receiving step receives information of acceptable data formats through the second delivery request from said at least one data terminal, and said method further comprising the steps of:
   instructing said data format converting step to convert said transfer-request image file using a data format which matches said acceptable data formats; and
   sending said converted transfer-request image file to said at least one data terminal.

50. The method of claim 49, wherein said second receiving step receives said information of acceptable data formats in an accept field which is included in a request header of the second delivery request.

51. The method of claim 39, further comprising the step of:
   including a plurality of different data formats; and
   converting said transfer-request image file stored in said first memory means into a plurality of different-formatted transfer-request image files using said plurality of different data formats,
   wherein said second receiving step receives information of acceptable data formats through the second delivery request from said at least one data terminal,
   and said method further comprising the steps of:
   searching a file having a smallest data amount among said plurality of different-formatted transfer-request image files of which data format matches said acceptable data formats; and
   selecting said smallest data file,
   and wherein said second transmitting step transmits said selected transfer-request image file to said at least one data terminal.

52. The method of claim 51, wherein said first storing step stores information of said acceptable data formats as a previously-accepted data format and said actually used data format as a previously-used data format during a previous transmission operation in response to said second delivery request which has been made previously, and wherein upon a new receipt of said information of acceptable data formats which are equivalent to said previously-accepted data formats, said selecting step selects said transfer-request image file in said previously-used data format, which matches one of said acceptable data formats, from among said plurality of different-formatted transfer-request image files stored in said first storing step through said previous transmission operation, and said second transmitting step transmits said selected transfer-request image file in said previously-used data format to said at least one data terminal.

53. The method of claim 52, wherein either one of when said acceptable data formats of said newly-received information are different from said previously-accepted data formats and when none of said previously-accepted data formats are stored by said first storing step, said searching step searches a file having a smallest data amount from among said plurality of different-formatted transfer-request image files of which data format matches said acceptable data formats of said newly-received information, said selecting step selects said searched transfer-request image file, and said second transmitting step transmits said selected transfer-request image file to said at least one data terminal.

54. The method of claim 39, wherein said first web page is in accordance with a hyper text markup language (HTML).

55. The method of claim 39, wherein said predetermined web page browsing procedure, said first delivery request, and second delivery request conform to a hyper text transfer protocol (HTTP).

56. The method of claim 39, wherein said first predetermined communications procedure is a Group 3 facsimile procedure.

57. The method of claim 39, wherein said second predetermined communications procedure is at least one of a simple mail transfer protocol (SMTP), a multipurpose Internet message extensions (MIME), and a file transfer protocol.

* * * * *